(12) United States Patent  (10) Patent No.: US 7,529,034 B2
Kawakami et al.  (45) Date of Patent: May 5, 2009

(54) ZOOM LENS AND PROJECTOR USING ZOOM LENS

(75) Inventors: Etsuro Kawakami, Tokyo (JP); Yasuyuki Tejima, Itabashi (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/799,612

(22) Filed: May 2, 2007

(65) Prior Publication Data

US 2008/0024876 A1    Jan. 31, 2008

(30) Foreign Application Priority Data

Jul. 31, 2006    (JP) ............................. 2006-208672

(51) Int. Cl.
*G02B 15/14* (2006.01)
(52) U.S. Cl. ....................................... 359/680; 359/686
(58) Field of Classification Search ................ 359/680, 359/681, 682, 686
See application file for complete search history.

(56) References Cited

U.S. PATENT DOCUMENTS 6,606,201 B1 * 8/2003 Hirose ......................... 359/686

FOREIGN PATENT DOCUMENTS

JP    2004-271668 A    3/2004

* cited by examiner

*Primary Examiner*—Scott J Sugarman
(74) *Attorney, Agent, or Firm*—Frishauf, Holtz, Goodman & Chick, P.C.

(57) ABSTRACT

There is provided a compact zoom lens having a small lens aperture which an image from a light valve such as a DMD is projected on to a screen in an enlarged scale.

There is provided a zoom lens comprising, in order from a magnifying side, a first lens group having a negative refractive power as a whole, a second lens group having a positive or negative refractive power as a whole, a third lens group having a positive refractive power as a whole and a fourth lens group having a positive refractive power as a whole, wherein a variable power as a whole lens system thereof is established by configuring such that the fourth lens group is left fixed while a variable power is effected, and the first lens group, the second lens group and the third lens group are made to move on the optical axis.

20 Claims, 14 Drawing Sheets

FIG. 2
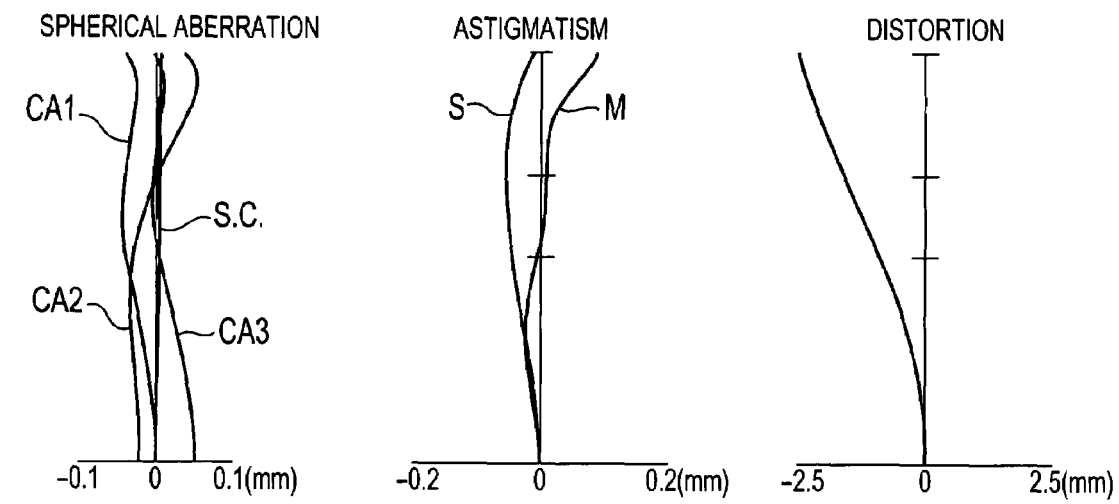
(EMBODIMENT 1: WIDE-ANGLE END)
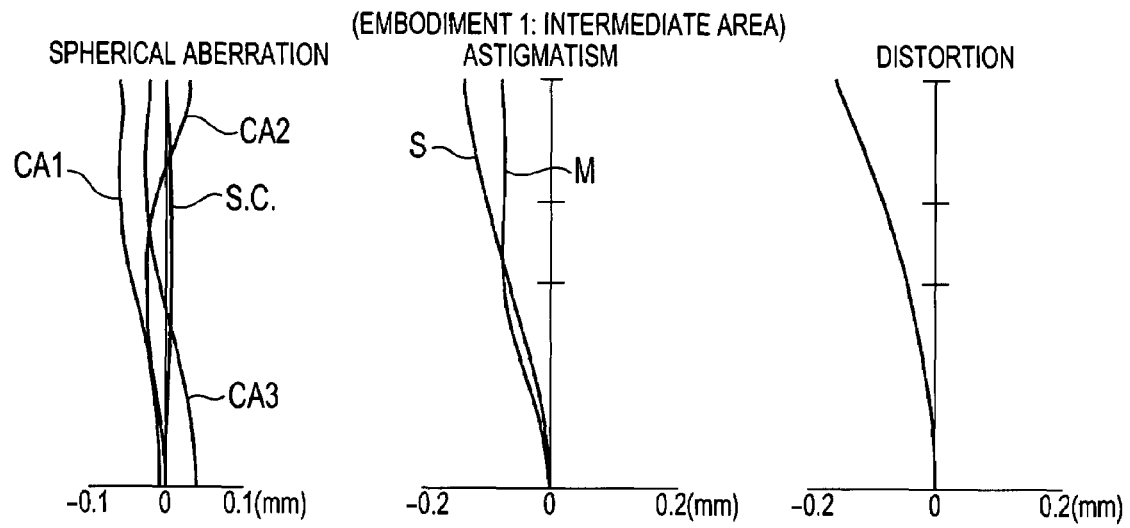
(EMBODIMENT 1: INTERMEDIATE AREA)
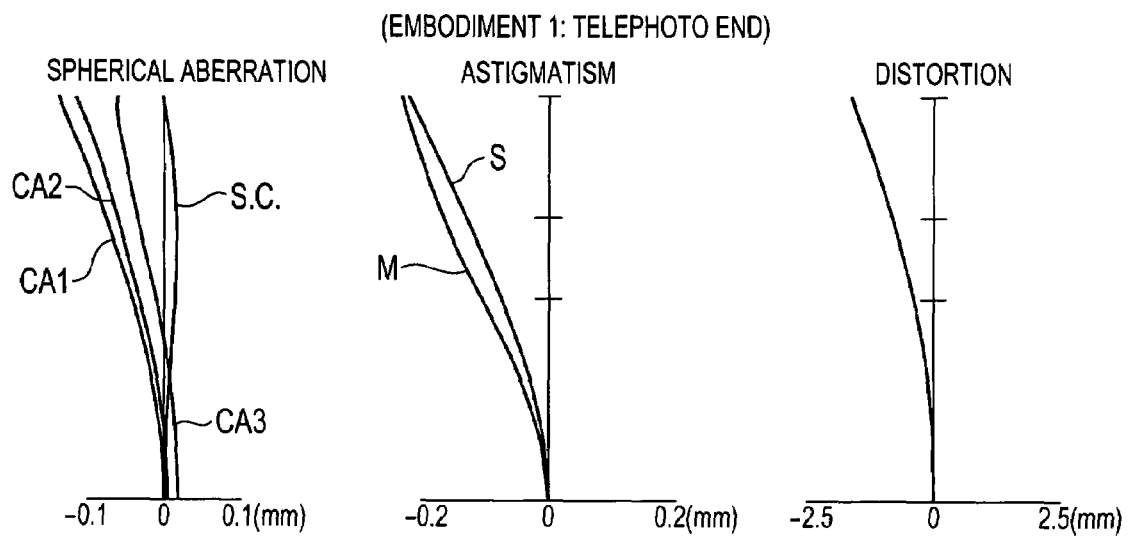
(EMBODIMENT 1: TELEPHOTO END)

FIG. 4
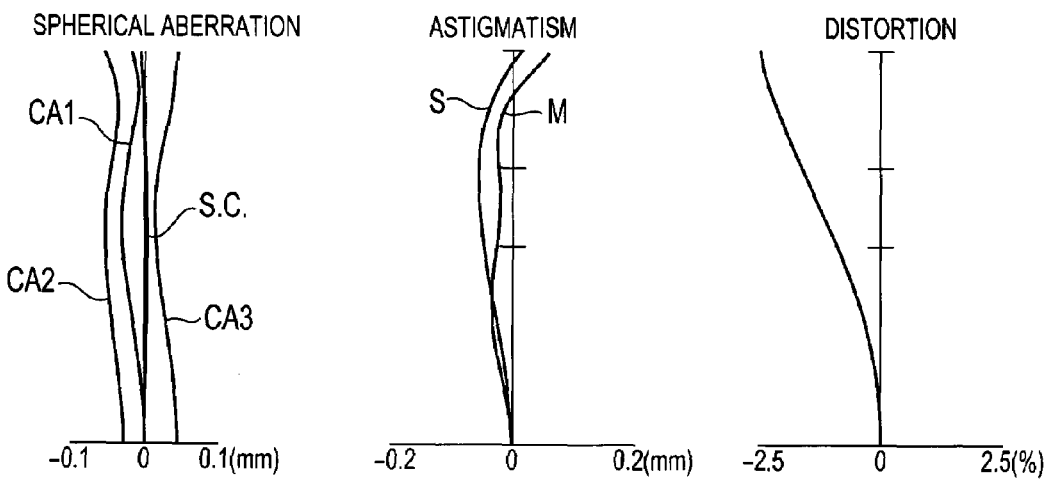
(EMBODIMENT 2: WIDE-ANGLE END)
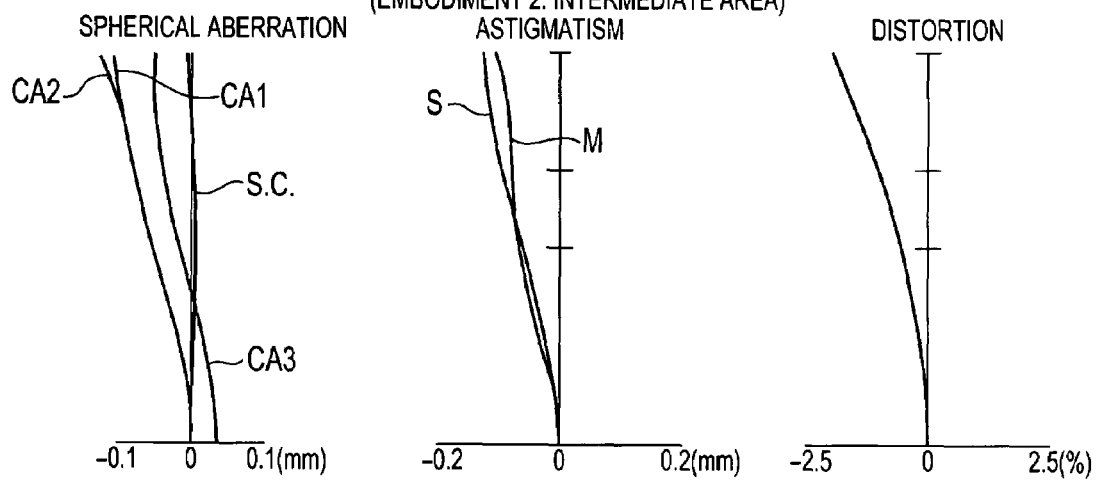
(EMBODIMENT 2: INTERMEDIATE AREA)
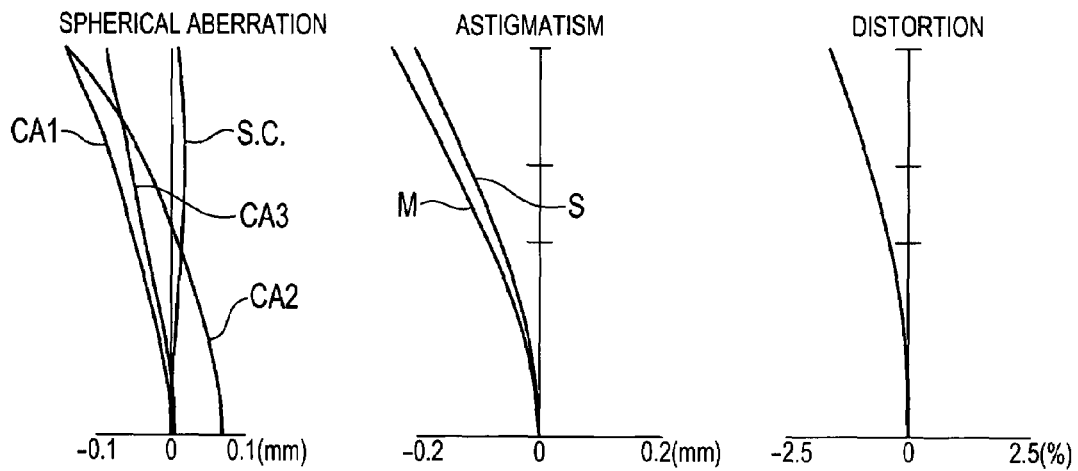
(EMBODIMENT 2: TELEPHOTO END)

(EMBODIMENT 3)

FIG. 6
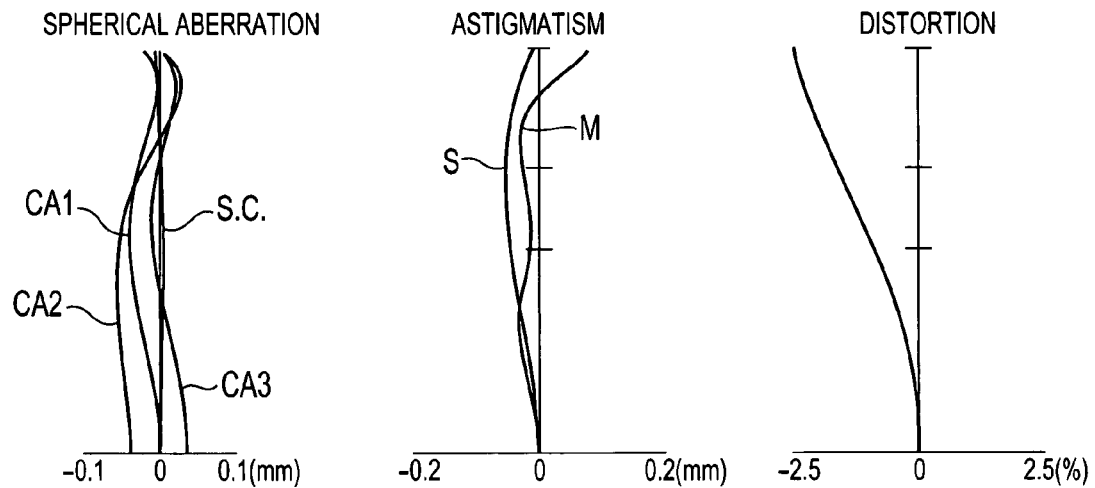
(EMBODIMENT 3: WIDE-ANGLE END)
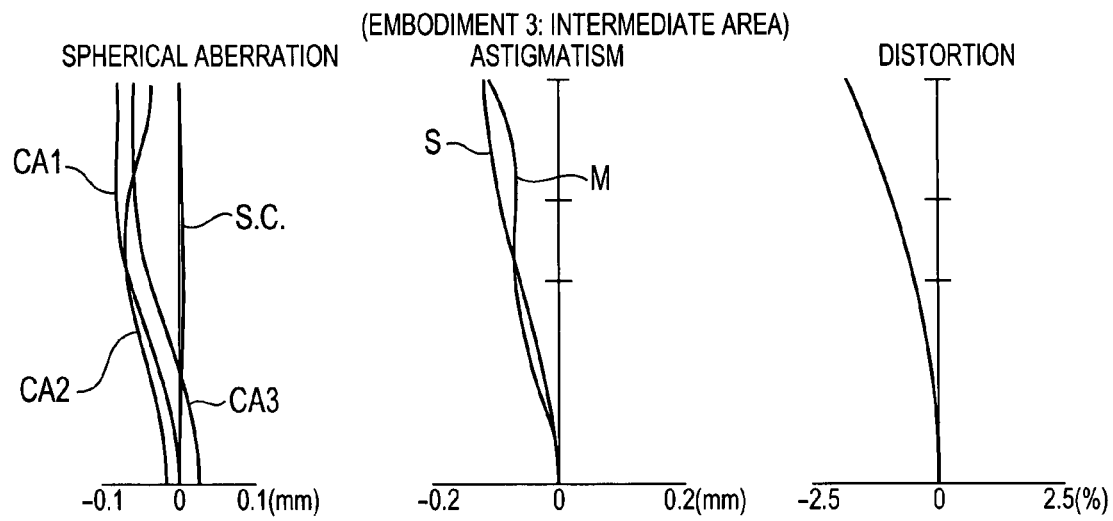
(EMBODIMENT 3: INTERMEDIATE AREA)
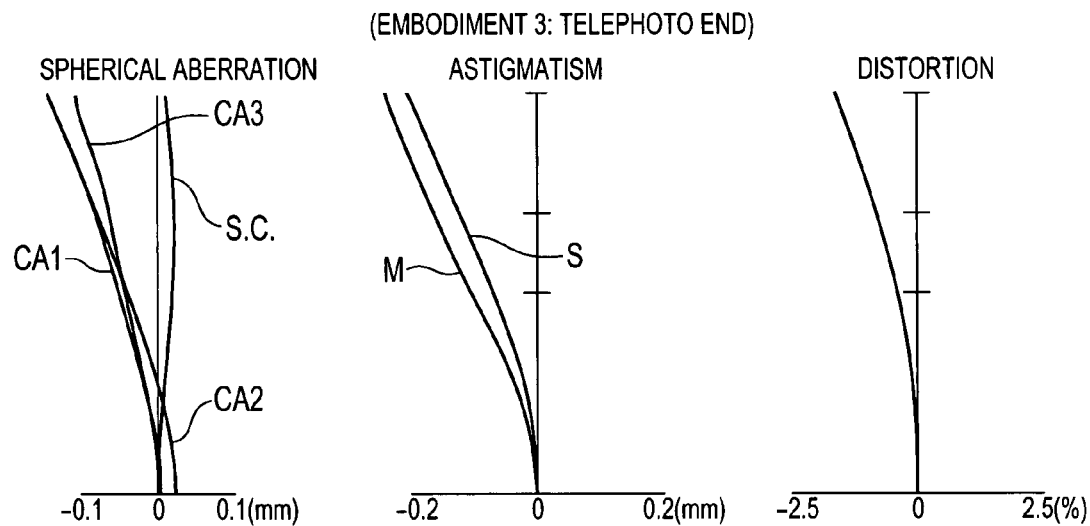
(EMBODIMENT 3: TELEPHOTO END)

(EMBODIMENT 4)

FIG. 8
(EMBODIMENT 4: WIDE-ANGLE END)
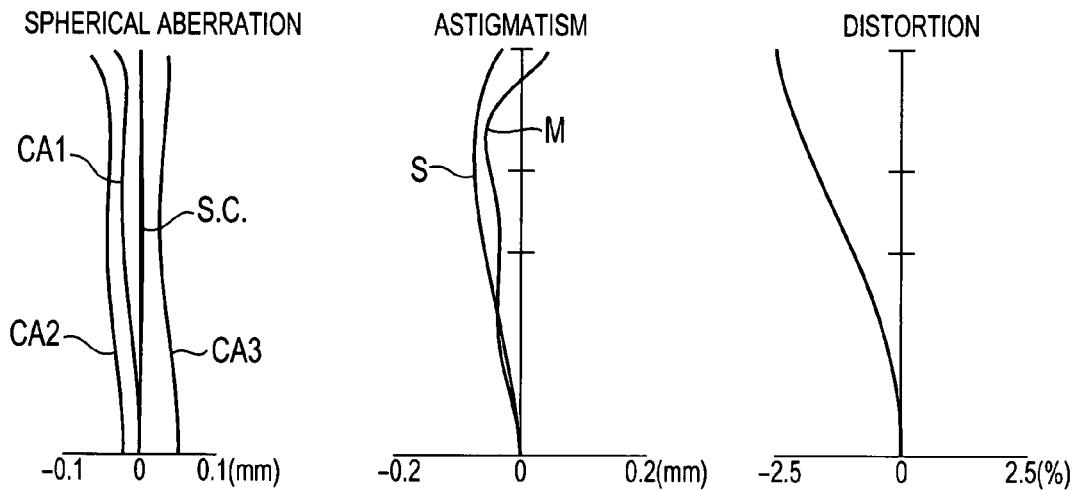
(EMBODIMENT 4: INTERMEDIATE AREA)
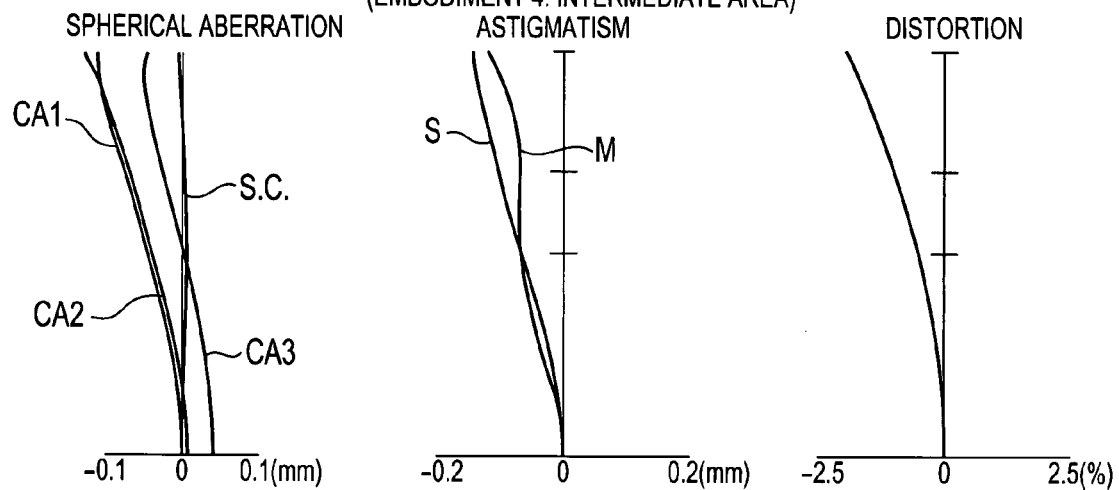
(EMBODIMENT 4: TELEPHOTO END)
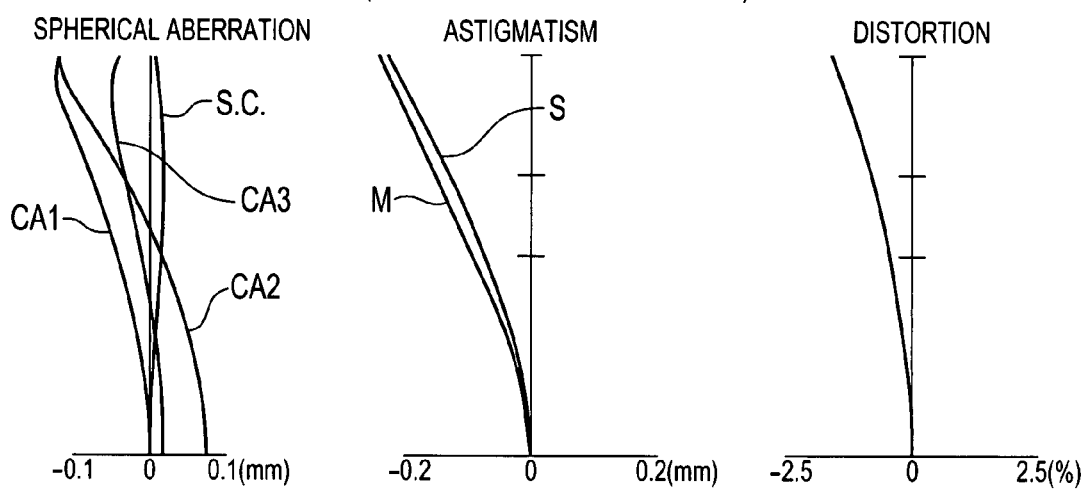

(EMBODIMENT 5)

FIG. 10
(EMBODIMENT 5: WIDE-ANGLE END)
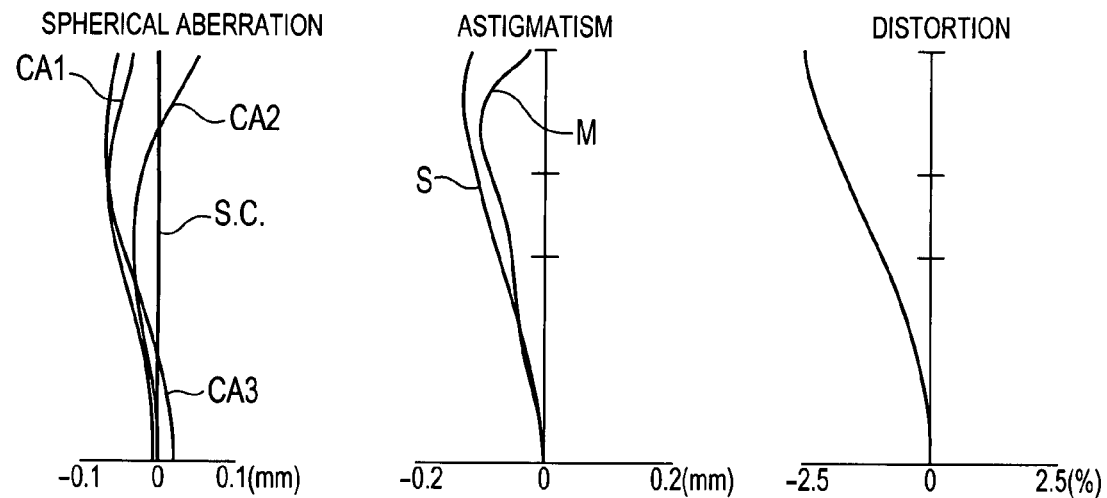
(EMBODIMENT 5: INTERMEDIATE AREA)
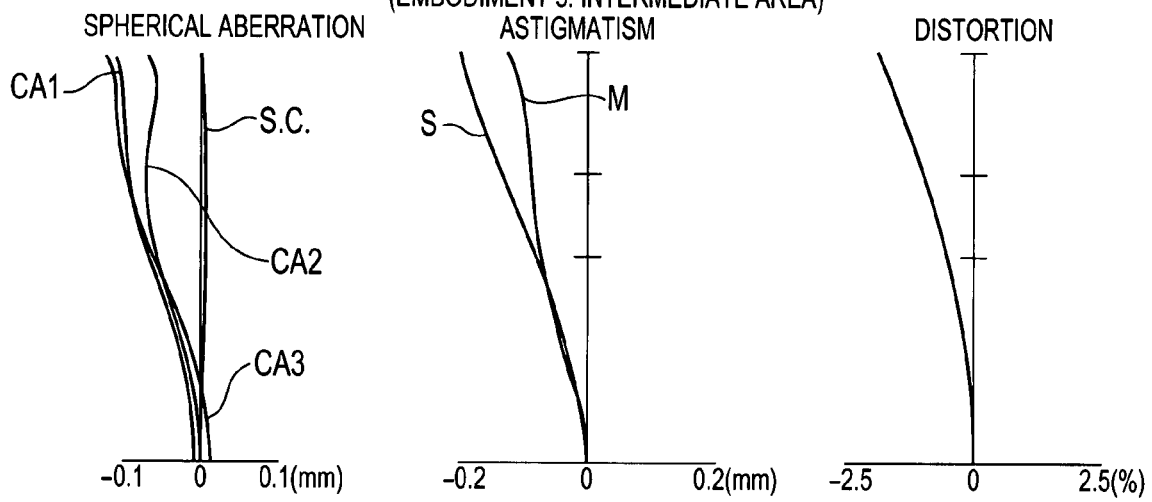
(EMBODIMENT 5: TELEPHOTO END)
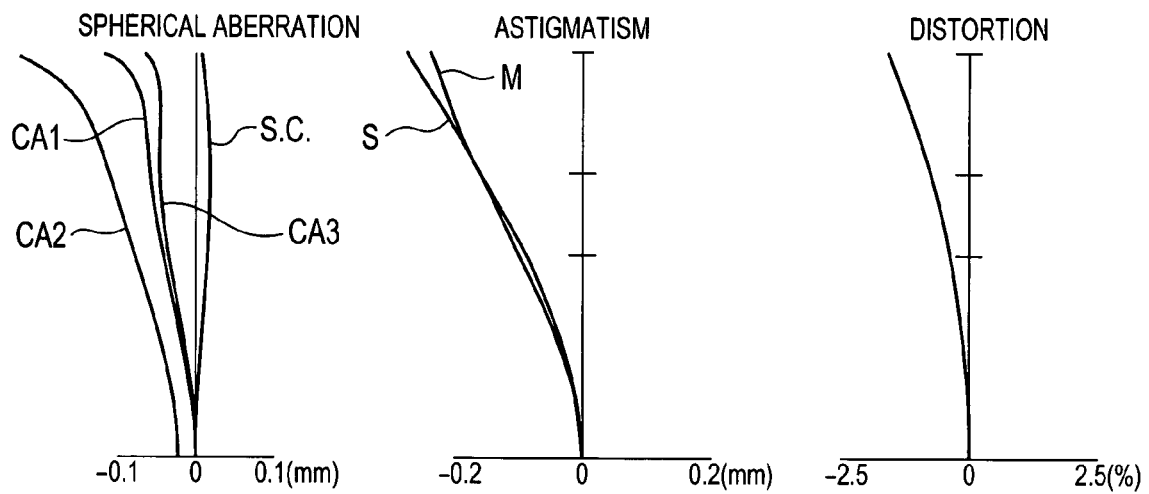

(EMBODIMENT 6)

FIG. 12
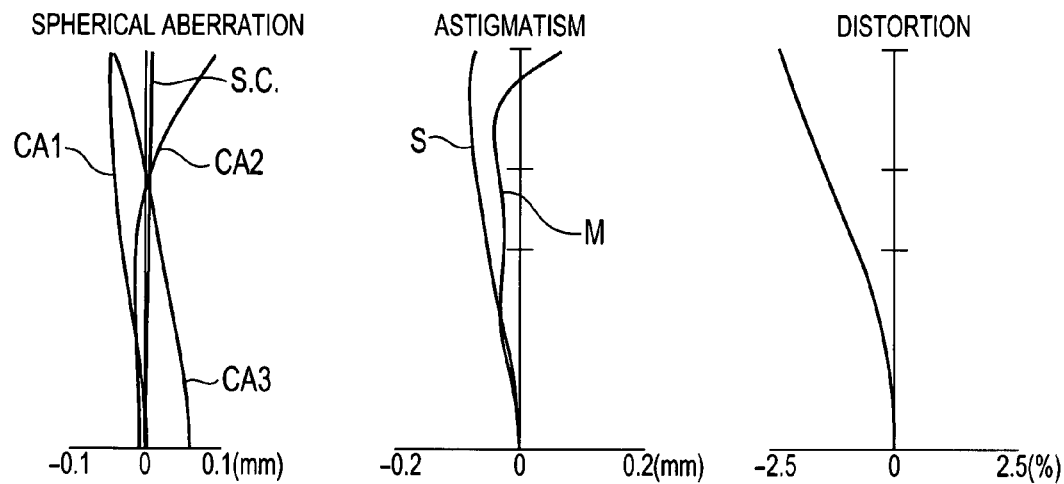
(EMBODIMENT 6: WIDE-ANGLE END)
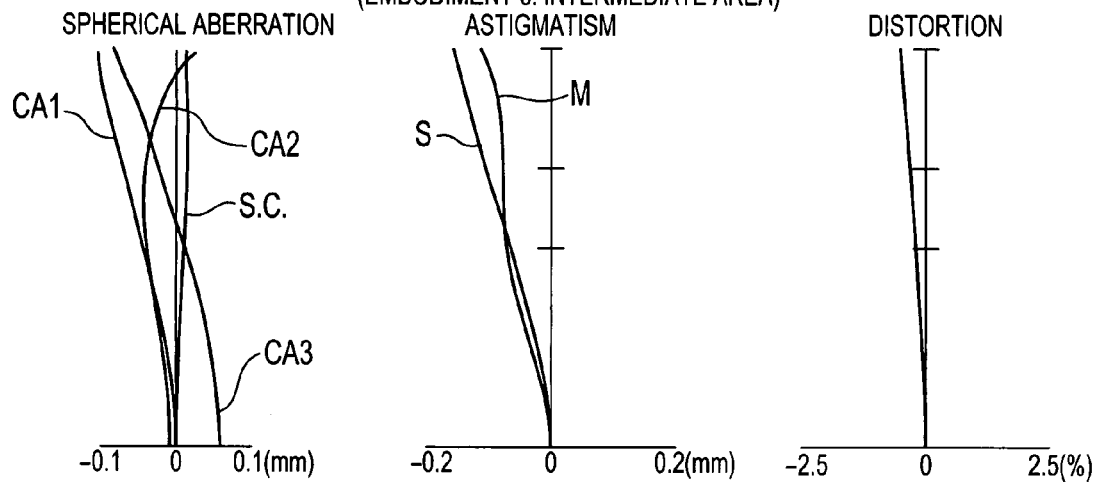
(EMBODIMENT 6: INTERMEDIATE AREA)
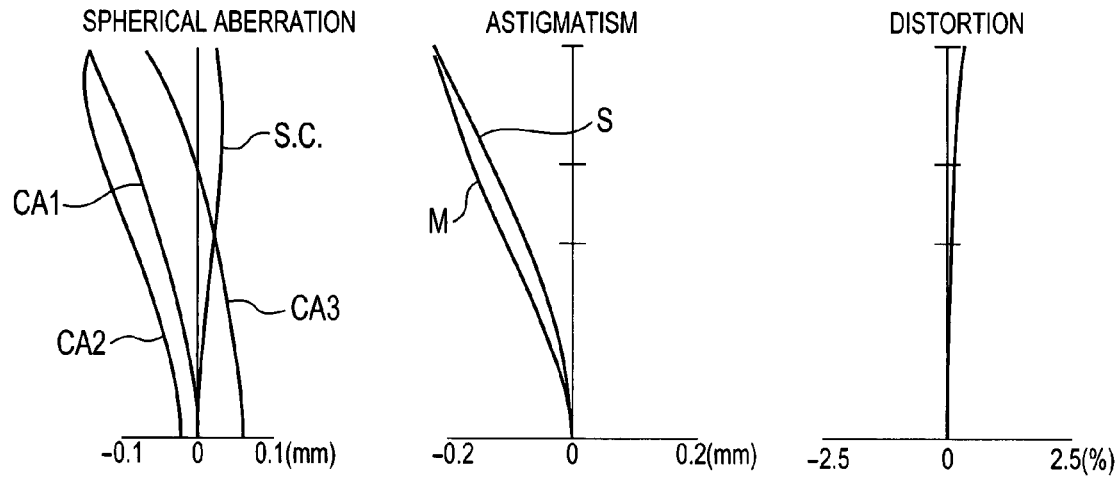
(EMBODIMENT 6: TELEPHOTO END)

FIG. 14
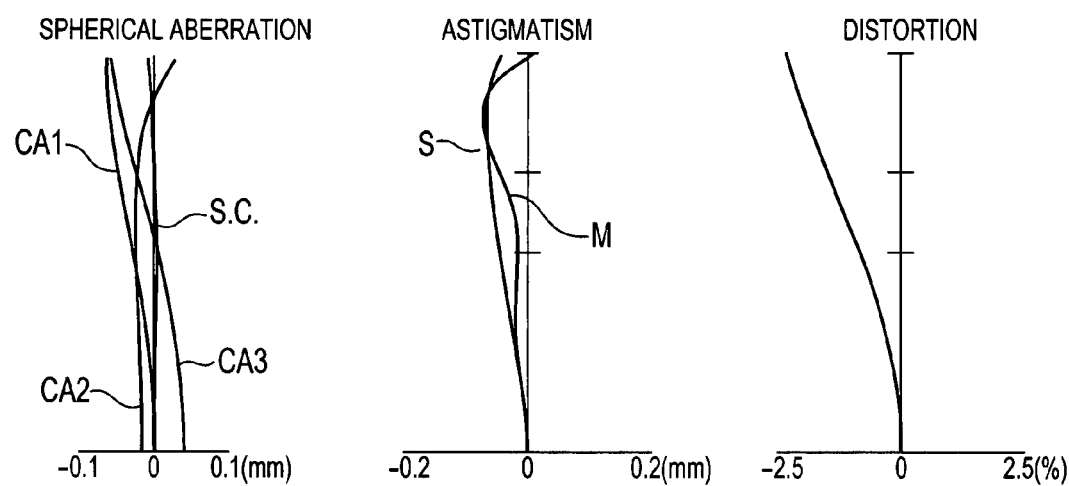
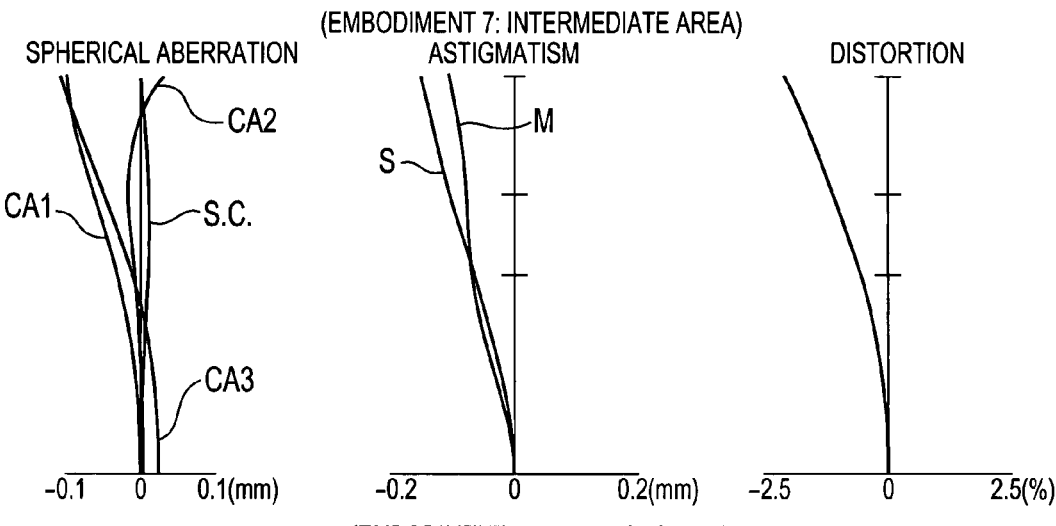
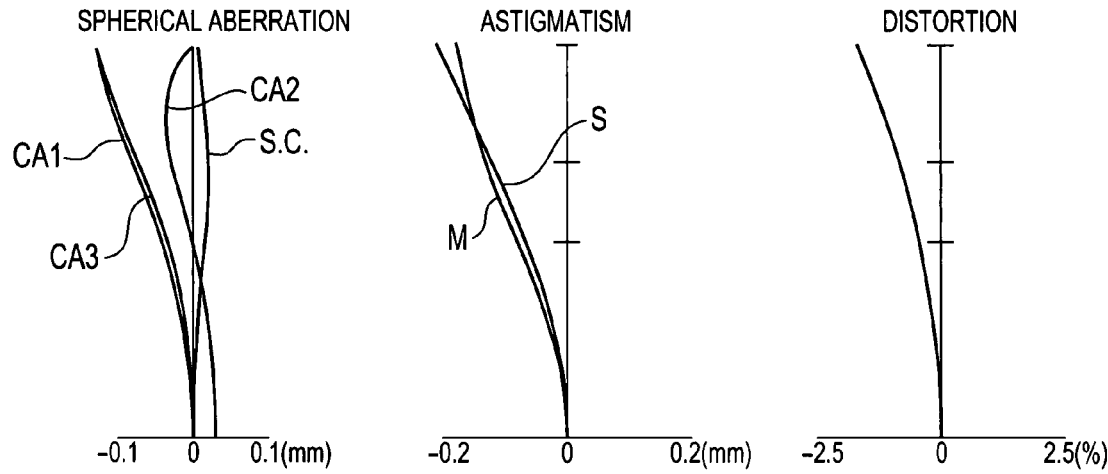

ZOOM LENS AND PROJECTOR USING ZOOM LENS

BACKGROUND OF THE INVENTION

The present invention relates to a compact zoom lens having a small lens aperture which an image from a light valve such as mainly a DMD (Digital Micromirror Device) which forms an image by changing reflecting directions of light on to a screen or the like in an enlarged scale.

A projector unit which adopts a DMD as a light valve is regarded as advantageous over other methods in miniaturizing the projector unit. Currently, portable compact projector units have been broadly propagated, and among them, data projectors constitute a center of interest because of its handiness when presenting information. In projector units which should be portable, it is critical to reduce the thickness of a projector unit, and hence, it can be said that the reduction in thickness is a most critical factor in projector units which are carried together with a note-type personal computer in many cases. As an example of a means for solving this problem, for example, the Japanese Unexamined Patent Publication No. 2004-271668 discloses a design method for making compact a projection lens.

An aspect of the invention is to provide a projector unit which is thin enough to be carried conveniently and which can project an enlarged image with high image quality on to a large screen despite its limited space by realizing a compact zoom lens.

SUMMARY OF THE INVENTION

According to a preferred aspect of the invention, there is provided a zoom lens including, in order from a magnifying side, a first lens group having a negative refractive power as a whole, a second lens group having a positive or negative refractive power as a whole, a third lens group having a positive refractive power as a whole and a fourth lens group having a positive refractive power as a whole.

In this zoom lens, a variable power as a whole lens system thereof is established by configuring such that the fourth lens group is left fixed while a variable power is effected, the first lens group and the second lens group are made to move on an optical axis in such a manner as to move in a direction from a magnifying side to a contracting side over a range from a wide angle end to an intermediate area and to move in a direction from the contracting side to the magnifying side over a range from the intermediate area to a telephoto end, and the third lens group is made to move on the optical axis in such a manner as to move in a direction from the contracting side to the magnifying side over a range from the wide angle end to the telephoto end.

In addition, in this zoom lens, the following conditional expression (1) is satisfied with respect to a power set at the first lens group and the second lens group, the following conditional expression (2) is satisfied with respect to a power set at the third lens group, and the following conditional expression (3) is satisfied with respect to a positional relationship between the third lens group and the fourth lens group at the wide angle end:

$$-0.9 < f_w/f_{I\text{-}II} < -0.5 \quad (1)$$

$$0.3 < f_w/f_{III} < 0.55 \quad (2)$$

$$1.7 < d_{wIII}/f_w \quad (3)$$

where $f_w$: composite focal length of the whole lens system at the wide angle end
(focused at a magnifying side object distance of 1700 mm from a lens surface of the first lens group which is situated closest to the magnifying side);

$f_{I\text{-}II}$: composite focal length of the first lens group and the second lens group at the wide angle end
(focused at a magnifying side object distance of 1700 mm from a lens surface of the first lens group which is situated closest to the magnifying side);

$f_{III}$: composite focal length of the third lens group;

$d_{wIII}$: airspace between the third lens group and the fourth lens group at the wide angle end.

BRIEF DESCRIPTION OF THE DRAWINGS

FIG. 2 is a drawing showing aberrations of the zoom lens of the first embodiment.

FIG. 4 is a drawing showing aberrations of the zoom lens of the second embodiment.

FIG. 6 is a drawing showing aberrations of the zoom lens of the third embodiment.

FIG. 8 is a drawing showing aberrations of the zoom lens of the fourth embodiment.

FIG. 10 is a drawing showing aberrations of the zoom lens of the fifth embodiment.

FIG. 12 is a drawing showing aberrations of the zoom lens of the sixth embodiment.

FIG. 14 is a drawing showing aberrations of the zoom lens of the seventh embodiment.

DESCRIPTION OF THE PREFERRED EMBODIMENTS

Figure 1:
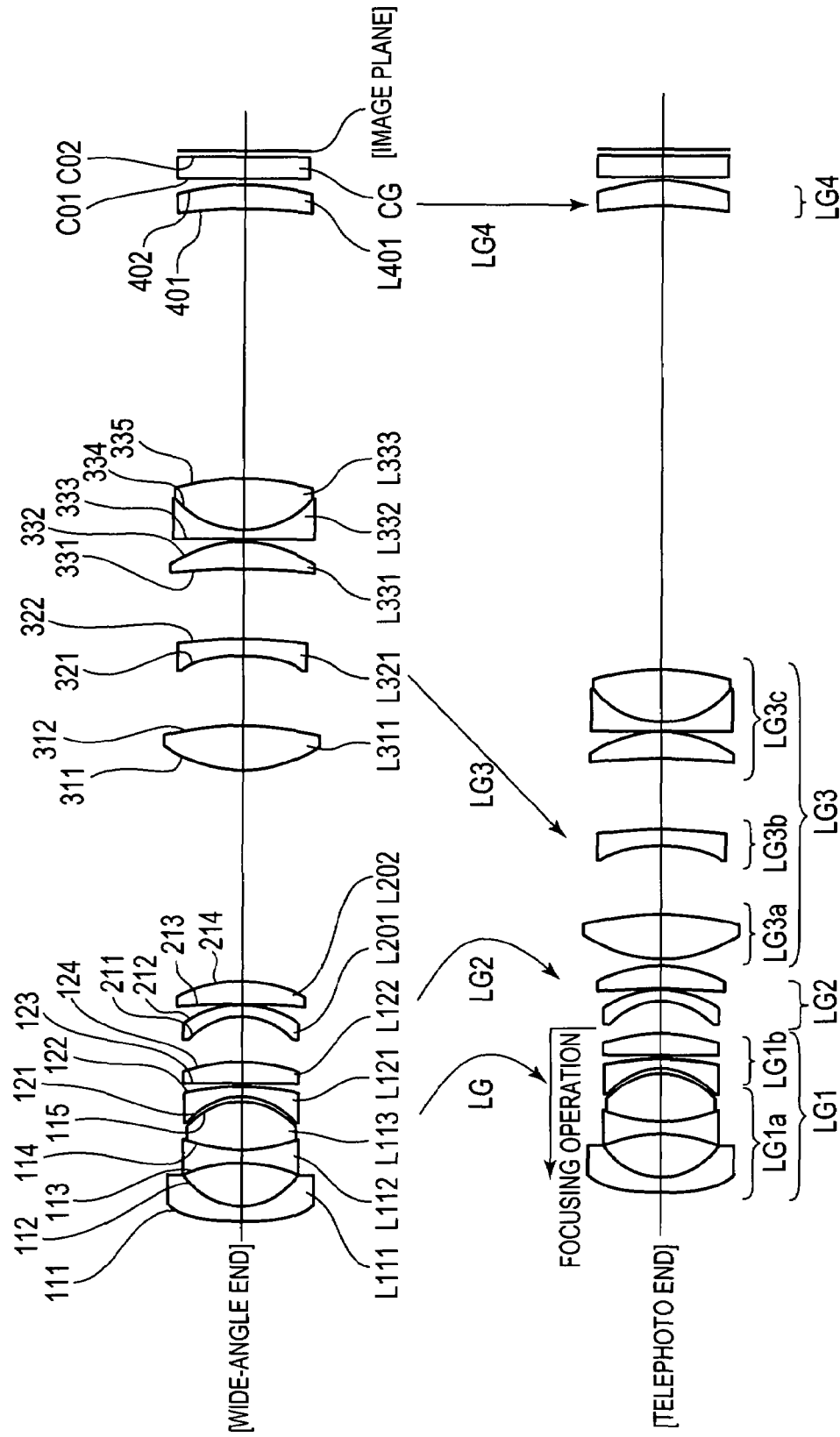
FIG. 1 is a drawing showing a lens configuration of a first embodiment of a zoom lens according to the invention.

Hereinafter, the present invention will be described based on specific numerical embodiments thereof. In first embodiment to seventh embodiment which will be described below, a zoom lens is made up of, in order from a magnifying side, a first lens group LG1 having a negative refractive power as a whole, a second lens group LG2 having a positive or negative refractive power as a whole, a third lens group LG3 having a positive refractive power as a whole and a fourth lens group LG4 having a positive refractive power as a whole.

The first lens group LG1 is made up by disposing, in order from the magnifying side, a first a lens group LG1$a$ and a first b lens group LG1$b$.

The first a lens group LG1$a$ is made up by disposing, in order from the magnifying side, a meniscus lens element having a negative refractive power which is made convex toward the magnifying side (hereinafter, referred to as a negative lens element) (designated as L111 and having a magnifying side surface 111 and a contracting side surface 112), a negative lens element (designated as L112 and having a magnifying side surface 113 and a contracting side surface 114) and a lens element having a positive refractive power (hereinafter, referred to as a positive lens element) (designated as L113 and having a magnifying side surface 115 and a contracting side surface 116, but when cemented to the lens element L112, having a magnifying side surface 114 and a contracting surface 115).

The first b lens group LG1b, which follows the first a lens group LG1a, has a heavily concaved surface which is made concave towards the contracting side as a refracting surface which is situated closest to the magnifying side and a convex surface which is made convex towards the contracting side as a refracting surface which is situated closest to the contracting side and is made up by disposing one or two lens elements (designated in order from the magnifying side as L121, L122 and having lens surfaces designated in order from the magnifying side as 121, 122 . . . ).

The second lens group LG2 is made up by disposing one or two lens elements which include at least one positive lens element (designated in order from the magnifying side as L201, L202, . . . and having surfaces designated in order from the magnifying side as 201, 202, . . . ).

The third lens group LG3 is made up by disposing, in order from the magnifying side, a third a lens group LG3a, a third b lens group LG3b and a third c lens group LG3c.

The third a lens group LG3a has a positive refractive power as a whole and is made up by disposing a total of one to three lens elements including at least one positive lens (designated in order from the magnifying side as L311, L312, . . . and having lens surfaces designated in order from the magnifying side as 311, 312, . . . ). The third b lens group LG3b, which follows the third a lens group LG3, is made up by disposing a single lens element (designated as L321 and having surfaces designated in order from the magnifying side as 321, 322). And the third c lens group LG3c has a positive refractive power as a whole and is made up by disposing a total of three or four lens elements including at least two positive lens elements and one negative lens element (designated in order from the magnifying side as L331, L332, . . . and having surfaces designated in order from the magnifying side as 331, 332, . . . ).

The fourth lens group LG4 is made up by disposing a single positive lens element (designated as L401 and having a magnifying side surface designated as 401 and a contracting side surface designated as 402). In addition, a cover glass CG (having a magnifying side surface C01 and a contracting side surface C02), which is a constituent part of a light valve such as a DMD (Digital Micromirror Device), is disposed in a small airspace between the contracting side of the fourth lens group LG4 and a surface of the light valve.

The first a lens group LG1a and the first b lens group LG1b which make up the first lens group LG1 are fixed to a first lens barrel, and the third a lens group LG3a, the third b lens group LG3b and the third c lens group LG3c which make up the third lens group LG3 are fixed to a third lens barrel.

In addition, the fourth lens group LG4 is fixed during a variable power operation, the first lens group LG1 and the second lens group LG2 are made to move on the optical axis in a direction from the magnifying side to the contracting side over a range from a wide angle end to an intermediate area and are made to move on the optical axis in a direction from the contracting side to the magnifying side over a range from the intermediate range to a telephoto end, and the third lens group LG3 is made to move on the optical axis in a direction from the contracting side to the magnifying side over a range from the wide angle end to the telephoto end, whereby a variable power as a whole lens system of the zoom lens is effected.

As is known, the configuration of an aspherical surface which is used in each of the embodiments is defined by a curve plane obtained by rotating about the optical axis a curve given by the following aspherical expression with a Z axis formed in the optical axis direction and a Y axis formed in a direction which intersects the optical axis at right angles:

$$Z = (Y^2/r) / \left[ 1 + \sqrt{\{1 - (1+K)(Y/r)^2\}} \right] + A \cdot Y^4 + B \cdot Y^6 + C \cdot Y^8 + D \cdot Y^{10} + \ldots$$

where, r: paraxial radius of curvature; K: cone constant; A, B, C, D . . . : higher order aspherical coefficients.

Note that in representing the cone constant and higher order aspherical constant in tables, "E and a number following the E" represents a "power of 10." For example, "E-4" means $10^{-4}$, and a numerical value lying directly before this numeric value only has to be multiplied thereby.

Furthermore, the zoom lens of this embodiment includes, in order from the magnifying side, a first lens group having a negative refractive power as a whole, a second lens group having a positive or negative refractive power as a whole, a third lens group having a positive refractive power as a whole and a fourth lens group having a positive refractive power as a whole, wherein the following conditional expression (1) is satisfied with respect to a power set at the first lens group and the second lens group, the following conditional expression (2) is satisfied with respect to a power set at the third lens group, and the following conditional expression (3) is satisfied with respect to a positional relationship between the third lens group and the fourth lens group at the wide angle end:

$$-0.9 < f_w/f_{I-II} < -0.5 \qquad (1)$$

$$0.3 < f_w/f_{III} < 0.55 \qquad (2)$$

$$1.7 < d_{wIII}/f_w \qquad (3)$$

where $f_w$: composite focal length of the whole lens system at the wide angle end (focused at a magnifying side object distance of 1700 mm from a lens surface of the first lens group which is situated closest to the magnifying side);

$f_{I-II}$: composite focal length of the first lens group and the second lens group at the wide angle end (focused at a magnifying side object distance of 1700 mm from a lens surface of the first lens group which is situated closest to the magnifying side);

$f_{III}$: composite focal length of the third lens group;

$d_{wIII}$: airspace between the third lens group and the fourth lens group at the wide angle end.

The airspace between the first lens group and the second lens group changes only little when the variable power is in effect. This is because these two lens groups are given the same function or role to play in consideration of the distribution of power of the whole system. Consequently, the conditional expression (1) represents a condition associated with an appropriate distribution of power to the first lens group and the second lens group which have the negative refractive power as a whole. Namely, this becomes a necessary condition for balancing a condition for properly correcting the size of the whole optical system and aberrations.

In addition, a space where an optical system for illuminating the light valve such as the DMD is disposed needs to be secured in an airspace portion defined between the third lens group and the fourth lens group, and the conditional expression (1) also has an objective to secure the space. Because of this, in the event that a lower limit of the expression is surpassed, the resultant negative power of the first lens group and the second lens group becomes large, and in conjunction with this, the positive power of the third lens group and the fourth lens group has to intensified, whereby balancing the aberrations becomes difficult and the performance is deteriorated. On the contrary, in the event that an upper limit of the expression is surpassed, a large airspace has to be defined between the first and second lens groups and the third lens group, whereby the size of the whole optical system becomes large, which contradicts to the object of the invention to miniaturize the zoom lens, or no airspace portion can be secured between the third lens group and the fourth lens group.

The conditional expression (2) is associated with the third lens group having the strong positive power which governs the variable power of the whole lens system by moving along the optical axis direction. In the event that the positive power increases to exceed an upper limit, the moving distance of the third lens group in relation to variable power can be small, but the balance with the other lens groups is collapsed, whereby the performance is decreased. On the contrary, in the event that a lower limit is surpassed, it is advantageous with respect to aberration, but the moving distance is increased, and this will do the damage to the miniaturization of the zoom lens.

In addition, the conditional expression (3) is a space condition of the third lens group and the fourth lens group at the wide angle end. As has been described above, this space needs to be secured for the space for the illumination system of the light valve. Consequently, in the event that a lower limit is surpassed, the space for the illumination system becomes insufficient, which makes difficult the design of a projector unit.

Furthermore, the first lens group is made up by disposing, in order from the magnifying side, a first a lens group and a first b lens group, the first a lens group being made up by disposing, in order from the magnifying side, a meniscus negative lens element which is made convex toward the magnifying side, a negative lens element and a positive lens element, the first b lens group having a refracting surface on a side lying closest to the magnifying side which is a surface which is made heavily concave towards the contracting side and a refracting surface on a side lying closest to the contracting side which is a surface which is made convex towards the contracting side and being made up by disposing one or two lens elements, and the following conditional expression (4) is satisfied with respect to a power set at the first a lens group, the following conditional expression (5) is satisfied with respect to a power set at the first b lens group, and the following conditional expression (6) is satisfied with respect to a size of the first lens group and the second lens group on the optical axis:

$$-0.85 < f_w/f_{Ia} < -0.3 \quad (4)$$

$$-0.55 < f_w/f_{Ib} < 0 \quad (5)$$

$$1.2 < T_{I\text{-}II}/f_w < 2.3 \quad (6)$$

where, $f_{Ia}$: composite focal length of the first a lens group which makes up the first lens group;

$f_{Ib}$: composite focal length of the first b lens group which makes up the first lens group;

$T_{I\text{-}II}$: a distance on the optical axis between a magnifying side surface of a lens element of the first lens group which is disposed closest to the magnifying side and a contracting side surface of a lens element of the second lens group which is disposed closest to the contracting side at the wide angle end (focused at a magnifying side object distance of 1700 mm from the lens surface of the first lens group which is situated closest to the magnifying side).

The conditional expression (4) and the conditional expression (5) are such as to secure the space where to dispose the illumination system, that is, a portion corresponding to a back focus, which is normally long, between the third lens group and the fourth lens group under the contradicting conditions of good performance and miniaturization.

Namely, the first lens group must have a strong negative power, and it is good to distribute such a negative power in a way expressed by the conditional expressions (4), (5). As the contents that are expressed by the respective conditional expressions, the conditional expression (4) relates to the negative power of the first a lens group. In order to extend the portion which corresponds to the back focus between the third lens group and the fourth lens group, it is effective to increase, in particular, the negative power of the first a lens group, and in the event that upper and lower limits are surpassed, the negative power of the first b lens group or the first a lens group becomes too large, and a good performance cannot be obtained.

Similarly, the conditional expression (5) relates to the negative power of the first b lens group, and in general, it is advantageous that the negative power of the first b lens group is smaller than that of the first a lens group. In the event that upper and lower limits are surpassed, the negative power of the first a lens group or the first b lens group becomes too large, and a good performance cannot be obtained.

The conditional expression (6), which follows the conditional expressions (4), (5), indicates an effective condition to decrease the aperture of, in particular, the lens lying in the vicinity of the front lens. Rays of light that have emerged from the first lens group are largely diffused due to the strong negative power of the first lens group, and consequently, the aperture of the lens tends to be easily increased. This is prevented by increasing the thickness of the first lens group in a way expressed by the conditional expression (6). On the other hand, in order to disperse the negative power of the first lens group, the number of lens elements needs to be increased, and hence, the first lens group inevitably needs to be long to some extent. In the event that a lower limit is surpassed, it becomes difficult to decrease the aperture, whereas in the event that an upper limit is surpassed, a size in the direction of optical axis becomes too large, and it becomes difficult to satisfy the specification. In addition to this, in association with the increase in the number of lens elements, the weight of the first lens group is increased, and this does the damage to the idea of miniaturization.

Furthermore, the following conditional expression (7) is satisfied with respect to a configuration of a contracting side surface of a lens element of the first a lens group which is disposed closest to the magnifying side, the following conditional expression (8) is satisfied with respect to a configuration of a magnifying side surface of a lens element of the first b lens group which is disposed closest to the magnifying side, the following conditional expression (9) is satisfied with respect to the characteristics of the refractive index of a glass material which is used for each of the lens elements which make up the first a lens group, and the following conditional expression (10) is satisfied with respect to the dispersing characteristics of the glass material used for each of the lens elements which make up the first a lens group:

$$0.85 < f_w/r_{Ia2} < 1.45 \quad (7)$$

$$-1.5 < f_w/r_{Ib1} < -0.8 \quad (8)$$

$$1.65 < N_{Ia} \quad (9)$$

$$V_{IaP} - V_{IaN} < 5.0 \quad (10)$$

where, $r_{Ia2}$: radius of curvature of the contracting side surface of the lens element of the first a lens group which is disposed closest to the magnifying side;

$r_{Ib1}$: radius of curvature of the magnifying side surface of the lens element of the first b lens group which is disposed closest to the magnifying side;

$N_{Ia}$: mean value of the refractive indexes of the respective lens elements which make up the first a lens group relative to the d line;

$V_{IaP}$: mean value of Abbe numbers of the respective positive lens elements which make up the first a lens group;

$V_{IaN}$: mean value of Abbe numbers of the respective negative lens elements which make up the first a lens group.

The conditional expression (7) relates to the configuration of the contracting side of the lens element of the first a lens group which is disposed closest to the magnifying side and defines a configuration which is made generally concentric relative to rays of light on the magnifying side and which basically suppresses the generation of aberrations while allowing the relevant lens group to keep the strong power. Consequently, in the event that an upper limit is surpassed, spherical aberration and coma aberration are corrected excessively, whereas in the event that a lower limit is surpassed, those aberrations are corrected insufficiently.

The following conditional expression (8) is such as to affect the spherical aberration and coma aberration in the first lens group and the aperture of the front lens element. The specification of the zoom lens of this embodiment requires that the angle of view at the wide angle end be wide while the aperture of the front lens element is designed small. Normally, these two conditions are conditions of contradicting natures. In order to decrease the aperture of the front lens element while attaining satisfied corrections of the respective aberrations, it is inevitable that a ray of light which corresponds to an image point where the height of an image becomes high needs to be passed through a position on the aperture of the front element where the height of the ray of light becomes low. It is the lens element of the first b lens group which is disposed closest to the magnifying side that realizes what has just been mentioned in a remarkable way within the first lens group. Although the power given to this lens element is relatively small, the lens element attains its purpose by being formed into the meniscus configuration in which the lens element is made convex largely on the contracting side thereof. On the other hand, a good balance has to be maintained between realization of the small aperture of the front lens element and correction of spherical aberration and coma aberration in the first lens group, and in the event that a lower limit is surpassed, that is, in the event that the radius of curvature becomes too small, the degree of freedom in correction of spherical aberration and coma aberration becomes insufficient, whereas in the event that an upper limit is surpassed, the aperture of the front lens element needs to be increased in order to maintain the good balance, thereby making it impossible to attain the given object of miniaturization of the zoom lens.

The conditional expression (9) relates to the characteristics of the refractive index of the first a lens group which has the particularly strong negative power. In order to reduce the strength of curvature which results from the acquisition of the strong negative power, the first a lens group must have a high refractive index, and in the event that a lower limit of the conditional expression is surpassed, the spherical aberration and coma aberration become too large because the curvature of the surface becomes too large, and the Petzval sum also becomes too small, thereby making it impossible to obtain a good performance.

The conditional expression (10) is an achromatism condition which constitutes the base of the first lens group and is also a condition for maintaining a good chromatic aberration correction. The conditional expression (10) represents the balance of the dispersion characteristics of the glass material which is used for the first a lens group which is responsible for the large negative power in the first lens group which has the strong negative power, and it is important to suppress the basic chromatic aberration generated in the interior of the lens group to a small level by balancing the dispersion characteristics. By selecting a glass material for these lens elements under the condition expressed by the conditional expression (10), a proper power distribution can be realized, thereby making it possible to correct the chromatic aberration properly. In the event that an upper limit is surpassed, the power of each lens element becomes too large due to the correction of chromatic aberration, and therefore, the aberrations are deteriorated.

Furthermore, a focusing operation is preferably attained by moving the first lens group in the direction of optical axis, and at least one side of a lens element of the first a lens group making up the first lens group which is disposed closest to the magnifying side is preferably aspheric, and the following conditional expression (11) is preferably satisfied with respect to a power to be set, the following conditional expression (12) is preferably satisfied with respect to a configuration of a magnifying side surface of a lens element of the first a lens group which is disposed second closest to the magnifying side, and the following conditional expression (13) is preferably satisfied with respect to the refractive index of a glass material used for the negative lens elements making up the first lens group:

$$-0.85 < f_w/f_{Ia1} < -0.5 \quad (11)$$

$$-0.8 < f_w/r_{Ia3} < -0.25 \quad (12)$$

$$1.65 < (n_{Ia1} + n_{Ia2} + n_{Ib1})/3 \quad (13)$$

where, $f_{Ia1}$: focal length of the lens element making up the first a lens group which is disposed closest to the magnifying side;

$r_{Ia3}$: radius of curvature of the magnifying side surface of the lens element making up the first a lens group which is disposed second closest to the magnifying side;

$n_{Ia1}$: refractive index of the lens element making up the first a lens group which is disposed closest to the magnifying side relative to the line d;

$n_{Ia2}$: refractive index of the lens element making up the first a lens group which is disposed second closest to the magnifying side relative to the line d;

$n_{Ib1}$: refractive index of the lens element making up the first b lens group which is disposed closest to the magnifying side relative to the line d.

The conditional expression (11) relates to the power set to the lens element making up the first a lens group which is disposed closest to the magnifying side and affects off-axis aberrations largely. In the event that an upper limit is surpassed, the negative power becomes too small, and a sufficient measure cannot be taken to correct the off-axial aberrations, whereas in the event that a lower limit is surpassed, the negative power becomes too large, and the aberrations including chromatic aberration are deteriorated.

The conditional expression (12) relates to the configuration of the magnifying side surface of the lens element making up the first a lens group which is disposed second closest to the magnifying side and constitutes, together with the conditional expressions (11) and (7), a condition for maintaining the balance of off-axis aberrations in the first a lens group. In the even that an upper limit is surpassed, the radius of curvature of the relevant surface becomes large and the curvature thereof becomes small, whereas in the event that a lower limit is surpassed, the curvature thereof becomes large. In either of the cases, it becomes difficult to correct chromatic aberration of magnification and distortion which are off-axis aberrations.

The following conditional expression (13) is a condition for correction of field curvature. The refractive index of the negative lens elements is increased to decrease the Petzval sum, and therefore, in the event that a lower limit is surpassed, the field curvature is increased.

Furthermore, the second lens group is made up of a total of one or two lens elements including at least one positive lens, and the following conditional expression (14) is preferably satisfied with respect to a power condition which is set at the second lens group in relation to the first lens group and the following conditional expression (15) is preferably satisfied with respect to the configuration of a surface of the second lens group which lies closest to the contracting side.

$$0.7 < f_{I\text{-}II}/f_I < 2.4 \quad (14)$$

$$-0.7 < f_W/r_{II\,L} < -0.15 \quad (15)$$

where, $r_{II\,L}$: radius of curvature of the contracting side surface of the lens element of the second lens group which is disposed closest to the contracting side.

As has been described above, while the same function is given to the first lens group and the second lens group with respect to variable power, that is, the function to be responsible for the strong negative component as a whole, the powers given to the respective groups are largely different. In consideration of the constitution of the whole system, it is understood that it is good that the negative power concentrates on the magnifying side. Namely, this means that the negative power is made to concentrate on the first lens group, while a low power is given to the second lens group, in which case the second lens group may have a negative or positive power. In addition, this largely relates to the relationship with focusing operation.

Although it is good that a focusing operation is performed in the first lens group, there is generated a restriction on the traveling amount of the first lens when it performs the relevant operation. Although giving a large power to the first lens group is advantageous in that a change in performance due to focusing distance is decreased, there is caused a possibility that the traveling amount becomes too small on the contrary, whereby it becomes mechanically impossible to perform the focusing operation in the first lens group. What represents the balance of traveling amount is the conditional expression (14). Consequently, surpassing an upper limit of the conditional expression (14) means a large negative power of the first lens group, and while this is advantageous to suppress the change in performance, since it is mechanically difficult to realize such a configuration, the configuration cannot be adopted as long as a special condition is given. On the contrary, since surpassing a lower limit means that the change in performance by virtue of focusing distance becomes large, generally, this causes a design problem.

In other words, the conditional expression (15) means that it is good that the surface of the second lens group which lies closest to the contracting side is kept generally in a concentric shape relative to rays of light which are generated mainly by the large negative power on the magnifying side of the first lens group. By this lens configuration, the generation of respective aberrations including spherical aberration is suppressed to a low level, and furthermore, it is important that such concentricity is generally maintained relative to the change of rays of light due to variable power. If this is not true, even in the event that an upper limit as well as a lower limit is surpassed in the conditional expression (15), respective aberrations including spherical aberration changes greatly when the variable power is in effects, this it becomes unable to maintain a good performance over the whole range of variable power.

Furthermore, the following conditional expression (16) is preferably satisfied with respect to a power set at the second lens group, and the following conditional expression (17) is preferably satisfied with respect to variation in the airspace between the first lens group and the second lens group relative to a variable power operation from the wide angle end to the telephoto end:

$$|f_W/f_{II}| < 0.4 \quad (16)$$

$$|d_{I\text{-}II}|/f_W < 0.3 \quad (17)$$

where, $f_{II}$: composite focal length of the second lens group;

$d_{I\text{-}II}$: variation in the airspace between the first lens group and the second lens group relative to a variable power operation from the wide angle end to the telephoto end (focused at a magnifying side object distance of 1700 mm from a lens surface of the first lens group which is situated closest to the magnifying side).

As has been described before, the positional relationship between the first lens group and the second lens group changes little in a variable power operation. When looking at these two lens groups from the viewpoint of power, the change in performance during a variable power operation and a focusing operation is successfully suppressed to a low level by adding the second lens group which has the small power to the first lens group which has the large negative power. Restricting conditions for this characteristic is expressed by the conditional expression (16) and the conditional expression (17), and in the event that power increases to exceed an upper limit in the conditional expression (16), the decrease in performance, in particular, during focusing is increased. In addition, departure from a range defined by the conditional expression (17) means that the variation is increased, and hence, more space becomes necessary, whereby miniaturization becomes difficult, and the change in performance during focusing is increased.

Furthermore, the third lens group is made up by disposing, in order from the magnifying side, a third a lens group, a third b lens group and a third c lens group. The third a lens group has a positive refractive power as a whole and is made up by disposing a total of one to three lens elements including at least one positive lens element, the third b lens group is made up by disposing one lens element, and the third c lens group has a positive refractive power as a whole and is made up by disposing a total of three or four lens elements including at least two positive lens and one negative lens. In addition, the following conditional expression (18), conditional expression (19) and conditional expression (20) are satisfied with respect to powers set at the third a lens group, third b lens group and third c lens group, respectively, and the following conditional expression (21) is satisfied with respect to the characteristics of the refractive index of a glass material used for each of the positive lens elements which make up the third lens group:

$$0.35 < f_w/f_{IIIa} < 0.65 \tag{18}$$

$$-0.35 < f_w/f_{IIIb} < -0.1 \tag{19}$$

$$-0.2 < f_w/f_{IIIc} < 0.35 \tag{20}$$

$$N_{IIIp} < 1.7 \tag{21}$$

where, $f_{IIIa}$: composite focal length of the third a lens group which makes up the third lens group;

$f_{IIIb}$: composite focal length of the third b lens group which makes up the third lens group;

$f_{IIIc}$: composite focal length of the third c lens group which makes up the third lens group;

$N_{IIIp}$: mean value of refractive indexes of the respective lens elements which make up the third lens group relative to the line d.

The conditional expression (18) relates to the third a lens group which is disposed on the magnifying side of the third lens group and which has a strong positive power, and one or two positive lens elements are necessary in the constituent lens elements.

This conditional expression represents a condition for giving a large positive power so as to receive and make rays of light which are diffused from the first lens group to the third lens group converge and correcting aberrations properly. In the event that an upper limit is surpassed, the positive power becomes too large, whereas in the event that a lower limit is surpassed, on the contrary, the positive power for convergence of the rays of light becomes insufficient. In either of the cases, the spherical aberration and chromatic aberration are largely affected.

The conditional expression (19) relates to the power of the third b lens group, and disposing this lens group in combination with the positive powers of the positive third a and third c lens groups is critical to basically suppress aberrations such as chromatic aberration and field curvature to a low level. In the event that the third b lens group has a negative power, the configuration of the powers of the constituent of the third lens group results in a triplet comprising positive, negative and positive powers in that order, and although this configuration is basically advantageous in correcting aberrations, when looking at the respective elements, since the negative lens elements reside in the group having the positive power, the group configuration does not necessarily have to have the triplet configuration. However, in the event that an upper limit is surpassed, since the group powers of the third a lens group and the third c lens group become small because of connecting chromatic aberration, the Petzval sum cannot be decreased. In the event that a lower limit is surpassed, since a combination of a strong positive power and a negative power results on the contrary, higher order spherical aberration and coma aberration become excessive.

In addition, the conditional expression (20) specifies the power of the third c lens group. By distributing the positive power of the third lens group as expressed by the conditional expressions (18) and (20), a good performance can be obtained. In the event that an upper limit is surpassed, the power of the third c lens group becomes too large, whereas in the event that a lower limit is surpassed, the power of the third a lens group becomes too large, and in either of the cases, a good performance cannot be obtained.

On the other hand, the conditional expression (21) relates to the refractive index of the positive lens elements of the constituent lens elements and represents a condition which is necessary in correcting field curvature. To realize the miniaturization of the zoom lens, the negative first lens group has the strong negative power, whereby the Petzval sum tends to become easily too small. By suppressing the refractive index of the positive lens elements which make up the third lens group to a low level by the conditional expression (21), a correction is performed while maintaining a good balance. Consequently, in the event that an upper limit is surpassed, the field curvature is corrected excessively.

Furthermore, the following conditional expression (22) is preferably satisfied with respect to the configuration of a magnifying side surface of a lens element of the third a lens group which is disposed closest to the magnifying side, and the following conditional expression (23) is preferably satisfied with respect to the dispersion characteristics of a glass material which is used for each of the positive lens elements which make up the third a lens group:

$$0 < f_w/r_{IIIa1} < 0.85 \tag{22}$$

$$60 < V_{IIIaP} \tag{23}$$

where, $r_{IIIa1}$: radius of curvature of the magnifying side surface of the lens element of the third a lens group which is disposed closest to the magnifying side;

$V_{IIIaP}$: mean value of Abbe numbers of the respective positive lens element which make up the third a lens group.

The conditional expression (22) is a conditional expression for correcting spherical aberration with a good balance. Namely, as to the configuration of the magnifying side surface of the lens element of the third a lens group which is disposed closest to the magnifying side, a configuration is given which has a strong positive power to make rays of light which emerge from the first lens group converge, and as a result of this, a larger under spherical aberration is generated. In conjunction with this, as will be described later on, a large over spherical aberration is generated on the magnifying side surface of the lens element of the third b lens group which is disposed closest to the magnifying side, whereby well-balanced relative constructions result.

Consequently, in the event that an upper limit of the conditional expression (22) is surpassed, the under spherical aberration becomes large, whereas in the event that a lower limit is surpassed, the over spherical aberration becomes large. However, the number of positive lens elements which make up the third a lens group is deeply involved, and although it is natural to say, having two positive lens elements produces a higher possibility that a value near to the lower limit of the range of the conditional expression is taken.

In addition, the conditional expression (23) represents a condition for correcting chromatic aberration. As has been described above, since the third a lens group has the strong positive power, it largely affects chromatic aberration. Consequently, as is expressed by the conditional expression (23), it is inevitable to use a material which has a large Abbe number (that is, small dispersion) for the positive lens elements. In the event that a lower limit is surpassed, the chromatic aberration relative to a short wavelength in the third a lens group becomes large towards the under side, and it becomes difficult to correct the chromatic aberration.

Furthermore, the following conditional expression (24) is preferably satisfied with respect to the configuration of a magnifying side surface of a lens element of the third b lens group:

$$-0.7 < f_w/r_{IIIb1} < -0.3 \quad (24)$$

where, $r_{IIIb1}$: radius of curvature of the magnifying side surface of the lens element of the third b lens group.

The conditional expression (24) is a conditional expression which corrects spherical aberration with good balance together with the conditional expression (22) as has been described previously. Since relative constructions like those that have been described above result, in the event that a lower limit is surpassed in the conditional expression (24) is surpassed, the over spherical aberration becomes large, whereas in the event that an upper limit is surpassed, the under spherical aberration becomes large.

Furthermore, the following conditional expression (25) is preferably satisfied with respect to the configuration of a contracting side surface of a lens element of the third c lens element which is disposed closest to the contracting side, and the following conditional expression (26) is preferably satisfied with respect to the dispersion characteristics of a glass material which is used for each of the lens elements which make up the third c lens group:

$$-0.65 < f_w/r_{IIIcL} < 0.05 \quad (25)$$

$$15 < V_{IIIcP} - V_{IIIcN} \quad (26)$$

where, $r_{IIIcL}$: radius of curvature of the contracting side surface of the lens element of the third c lens group which is disposed closest to the contracting side;

$V_{IIIcP}$: mean value of Abbe numbers of the respective positive lens elements which make up the third c lens group;

$V_{IIIcN}$: mean value of Abbe numbers of the respective negative lens elements which make up the third c lens group.

The conditional expression (25) is a conditional expression for correcting the spherical aberration over the whole lens system in an elaborate fashion. The correction performed in a way expressed by the conditional expression is such as to correct the residual spherical aberration which remains uncorrected by the configurations of the magnifying side surface of the lens element of the third a lens group which is disposed closest to the magnifying side and the magnifying side surface of the lens element of the third b lens group which is disposed closest to the magnifying side, which surfaces are dominant in correction of spherical aberration. In the event that an upper limit is surpassed, an insufficient correction results, and on the contrary, in the event that a lower limit is surpassed, an excessive correction results.

The conditional expression (26) is a condition for correcting color in the third c lens group. In order to correct monochromatic aberration, it is necessary that the power of each lens element does not become too large, and to make this happen, it is a necessary condition that the positive lens element and negative lens element have to have Abbe numbers which satisfy the conditional expression (26). In the event that a lower limit is surpassed, it becomes difficult to correct chromatic aberration.

Furthermore, the third c lens group includes a partial system constituent element which is made up of at least two lens elements, one negative lens element and one positive lens element, which are cemented together, and the following conditional expression (27) is preferably satisfied with respect to the refractive index of a glass material used for each of the lenses which are cemented together, and the following conditional expression (28) is preferably satisfied similarly with respect to the dispersion characteristics of the glass material used for each of the lens elements which are cemented together:

$$0.25 < N_{IIIcCN} - N_{IIIcCP} \quad (27)$$

$$30 < V_{IIIcCP} - V_{IIIcCN} \quad (28)$$

where, $N_{IIIcCP}$: mean value of the refractive indexes of the positive lens elements of the third c lens group which are disposed in the cemented partial system thereof relative to the line d;

$N_{IIIcCN}$: mean value of the refractive indexes of the negative lens elements of the third c lens group which are disposed in the cemented partial system thereof relative to the line d;

$V_{IIIcCp}$: mean value of Abbe numbers of the positive lens elements of the third c lens group which are disposed in the cemented partial system thereof;

$V_{IIIcCN}$: mean value of Abbe numbers of the negative lens elements of the third c lens group which are disposed in the cemented partial system thereof.

As for the cemented partial system of the third c lens group, a difference in refractive index is given to the cemented lenses, so as to expect an effect of the correction of field curvature while maintaining the correction capability of spherical aberration at the cemented surface.

In the event that a lower limit is surpassed in the conditional expression (27), field curvature is corrected excessively, while spherical aberration is corrected insufficiently. In addition, the conditional expression (28) is a conditional expression relating to the correction of chromatic aberration in the whole lens system, and in the event that a lower limit is surpassed, in particular, the chromatic aberration of magnification is increased.

Furthermore, the fourth lens group is made up by disposing one positive lens element, and the following conditional expression (29) is preferably satisfied with respect to a power set at the fourth lens group:

$$f_w/f_{IV} < 0.3 \quad (29)$$

where, $f_{IV}$: composite focal length of the fourth lens group.

In order to focus rays of light from the DMD on to the surface of the screen with good efficiency, a primary light ray angle of the rays of light between the fourth lens group and the DMD must be set in such a manner as to match the characteristics of the illuminating optical system. In many cases, however, the primary light ray angle is set to be substantially telecentric. In order to secure the telecentric characteristics in this space, the focal point of the fourth lens group needs to be positioned in the vicinity of a pupil which corresponds to rays of light on the contracting side of the third lens group, and it becomes possible to attain the object by giving a power to the fourth lens group within a range defined by the conditional expression (29). Consequently, even in the event that a lower limit as well as an upper limit is surpassed, matching between the pupil and the rays of light cannot be attained, whereby a quantity of light is decreased on the perimeter of the lens element or the aberrations are deteriorated.

Embodiment 1

A numerical example for a first embodiment of a zoom lens of the invention is shown in Table 1. In addition, FIG. 1 is a drawing showing a lens configuration of the first embodiment and FIG. 2 shows drawings illustrating aberrations thereof. In the table and drawings, f denotes a focal length of the whole zoom lens system, $F_{no}$ an F number, and $2\omega$ a total angle of view of the zoom lens. In addition r denotes radius of curvature, d lens thickness or space between lens elements, $n_d$ a refractive index relative to the line d, and $\nu_d$ Abbe number of the line d (where, numerical values in the table which change by virtue of focusing operation are numerical values which result when an object distance from a surface 101 is 1700 mm in a focused state). CA1, CA2, CA3 in the spherical aberration drawings in the drawings showing aberrations are aberration curves in wavelengths of CA1=550.0 nm, CA2=435.8 nm and CA3=640.0 nm, respectively. In addition, S. C. is a sine condition. In aspherical aberration drawings, S denotes sagital and M denotes meridional. In addition, throughout the tables, unless described specifically, a wavelength used in calculating various values is CA1=550.0 nm.

TABLE 1

| | Wide angle end | Intermediate area | Telephoto end |
|---|---|---|---|
| f | 15.93 | 22.17 | 30.83 |
| $F_{no}$ | 2.29 | 2.71 | 3.30 |
| $2\omega$ | 66.05 | 49.86 | 36.85 |
| Hereinafter, airspaces which change by variable power | | | |
| D9 | 5.64 | 4.43 | 3.65 |
| D13 | 26.76 | 11.70 | 0.79 |
| D22 | 34.00 | 44.22 | 58.40 |

| Serial numbers | Surface numbers | r | d | $n_d$ | $\nu_d$ |
|---|---|---|---|---|---|
| 1 | 111 | 52.340 | 2.00 | 1.80610 | 40.71 |
| 2 | 112 | 14.592 | 5.72 | — | — |
| 3 | 113 | −33.047 | 1.40 | 1.80420 | 46.49 |
| 4 | 114 | 32.402 | 6.20 | 1.54814 | 45.82 |
| 5 | 115 | −16.366 | 0.80 | — | — |
| 6 | 121 | −14.076 | 1.41 | 1.80420 | 46.49 |
| 7 | 122 | −46.537 | 0.20 | — | — |
| 8 | 123 | 723.466 | 3.10 | 1.84666 | 23.78 |
| 9 | 124 | −36.350 | [D9] | — | — |
| 10 | 201 | −15.385 | 1.40 | 1.80420 | 46.49 |
| 11 | 202 | −23.228 | 0.20 | — | — |
| 12 | 203 | −186.658 | 3.03 | 1.48749 | 70.45 |
| 13 | 204 | −29.045 | [D13] | — | — |
| 14 | 311 | 28.336 | 5.52 | 1.56907 | 71.30 |
| 15 | 312 | −66.907 | 8.99 | — | — |
| 16 | 321 | −31.900 | 2.00 | 1.80486 | 24.74 |
| 17 | 322 | −60.700 | 8.89 | — | — |
| 18 | 331 | −255.461 | 3.38 | 1.69895 | 30.05 |
| 19 | 332 | −30.513 | 0.21 | — | — |
| 20 | 333 | 333.183 | 1.22 | 1.80610 | 33.27 |
| 21 | 334 | 18.506 | 6.65 | 1.49700 | 81.61 |
| 22 | 335 | −55.155 | [D22] | — | — |
| 23 | 401 | −100.000 | 3.00 | 1.80610 | 33.27 |
| 24 | 402 | −44.000 | 0.66 | — | — |
| 25 | C01 | ∞ | 3.00 | 1.48745 | 64.84 |
| 26 | C02 | ∞ | — | — | — |

Aspherical coefficient

| | 111th surface | | 322nd surface |
|---|---|---|---|
| K = | −7.90723E−01 | K = | 0.00000E+00 |
| A = | 3.97214E−05 | A = | 1.87114E−05 |
| B = | −8.79892E−08 | B = | 9.86568E−09 |
| C = | 1.39367E−09 | C = | −6.26827E−12 |
| D = | −8.90309E−12 | | |
| E = | 3.06751E−14 | | |

Embodiment 2

Figure 3:
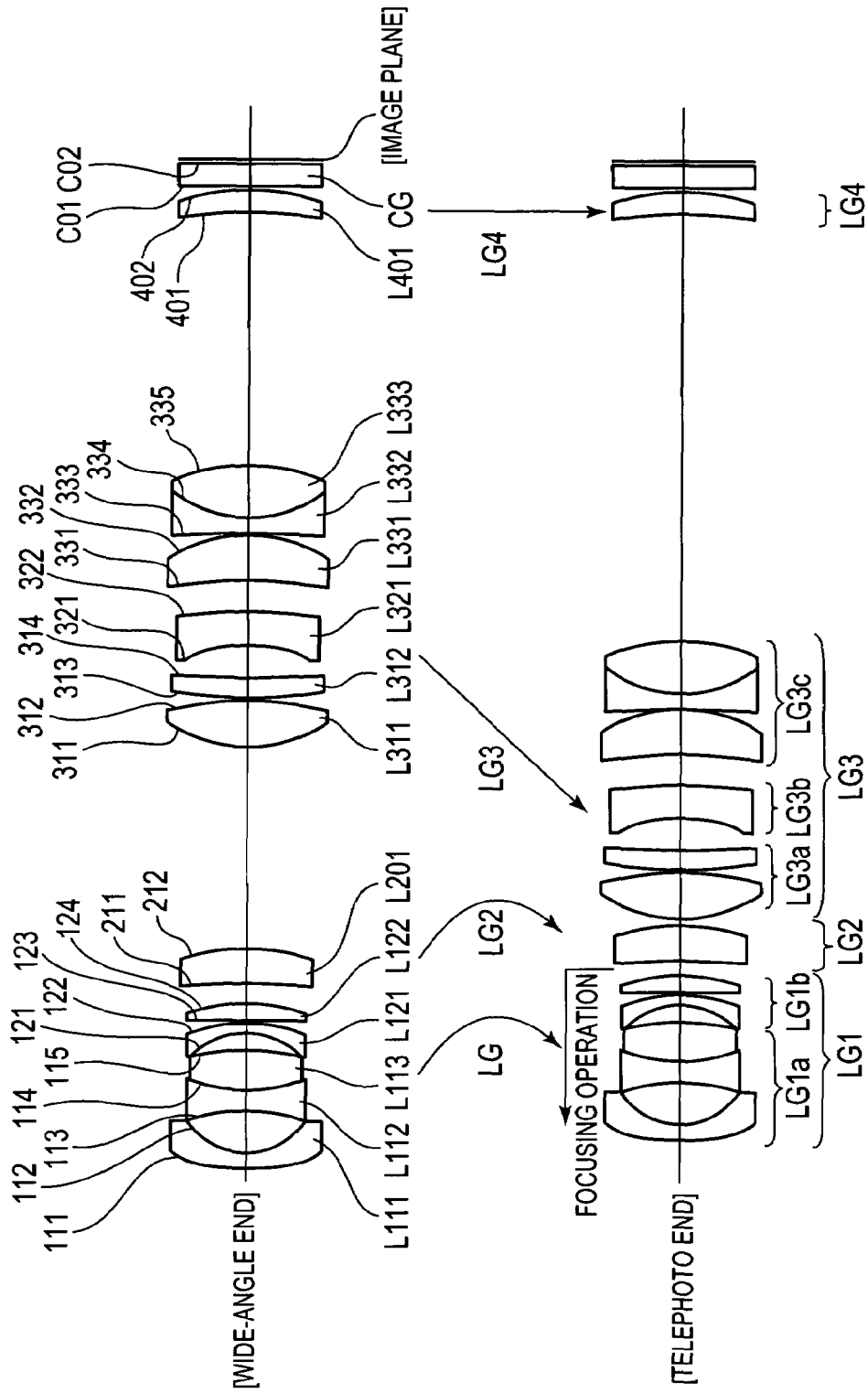
FIG. 3 is a drawing showing a lens configuration of a second embodiment of a zoom lens according to the invention.

A numerical example for a second embodiment of a zoom lens of the invention is shown in Table 2. In addition, FIG. 3 is a drawing showing a lens configuration of the second embodiment and FIG. 4 shows drawings illustrating aberrations thereof.

TABLE 2

| | Wide angle end | Intermediate area | Telephoto end |
|---|---|---|---|
| f | 15.96 | 22.23 | 30.88 |
| $F_{no}$ | 2.29 | 2.68 | 3.33 |
| $2\omega$ | 65.93 | 49.68 | 36.75 |
| Hereinafter, airspaces which change by variable power | | | |
| D9 | 2.86 | 2.48 | 2.10 |
| D11 | 27.34 | 11.62 | 0.79 |
| D22 | 34.00 | 43.88 | 57.61 |

| Serial numbers | Surface numbers | r | d | $n_d$ | $\nu_d$ |
|---|---|---|---|---|---|
| 1 | 111 | 59.524 | 2.00 | 1.80610 | 40.73 |
| 2 | 112 | 13.699 | 5.60 | — | — |
| 3 | 113 | −43.432 | 2.80 | 1.65844 | 50.84 |
| 4 | 114 | 31.144 | 5.30 | 1.75520 | 27.53 |
| 5 | 115 | −39.983 | 2.34 | — | — |
| 6 | 121 | −13.283 | 1.40 | 1.80420 | 46.49 |
| 7 | 122 | −32.347 | 0.20 | — | — |
| 8 | 123 | −361.443 | 2.30 | 1.48749 | 70.45 |
| 9 | 124 | −40.052 | [D9] | — | — |
| 10 | 201 | −176.501 | 4.75 | 1.53172 | 49.84 |
| 11 | 202 | −38.608 | [D11] | — | — |
| 12 | 311 | 24.321 | 6.26 | 1.49700 | 81.61 |
| 13 | 312 | −56.820 | 0.20 | — | — |
| 14 | 313 | 84.489 | 2.98 | 1.48749 | 70.45 |
| 15 | 314 | 231.171 | 4.14 | — | — |
| 16 | 321 | −30.838 | 4.50 | 1.80610 | 40.88 |
| 17 | 322 | −69.969 | 4.29 | — | — |
| 18 | 331 | −96.792 | 6.00 | 1.62004 | 36.30 |
| 19 | 332 | −25.804 | 0.20 | — | — |
| 20 | 333 | −239.591 | 2.25 | 1.80100 | 34.97 |
| 21 | 334 | 20.963 | 6.99 | 1.49700 | 81.61 |
| 22 | 335 | −36.055 | [D22] | — | — |
| 23 | 401 | −100.000 | 3.00 | 1.77250 | 49.60 |
| 24 | 402 | −44.000 | 0.66 | — | — |
| 25 | C01 | ∞ | 3.00 | 1.48745 | 64.84 |
| 26 | C02 | ∞ | — | — | — |

Aspherical coefficient

| | 111th surface | | 322nd surface |
|---|---|---|---|
| K = | 1.32148E+00 | K = | 5.73477E+00 |
| A = | 4.31474E−05 | A = | 2.55783E−05 |
| B = | −9.97527E−08 | B = | 1.54207E−08 |
| C = | 1.24007E−09 | C = | −2.03862E−11 |
| D = | −6.98174E−12 | | |
| E = | 2.29264E−14 | | |

Embodiment 3

Figure 5:
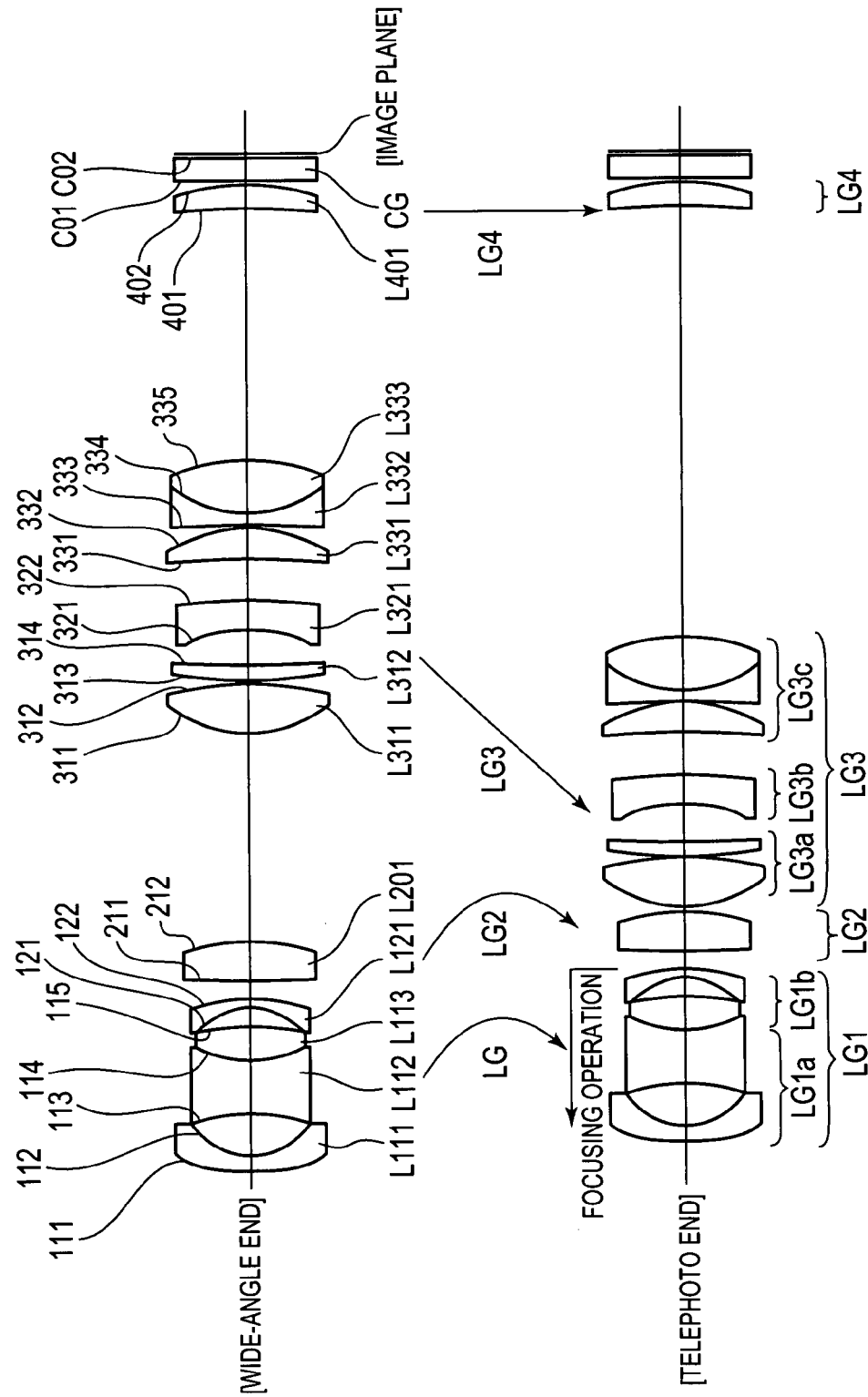
FIG. 5 is a drawing showing a lens configuration of a third embodiment of a zoom lens according to the invention.

A numerical example for a third embodiment of a zoom lens of the invention is shown in Table 3. In addition, FIG. 5 is a drawing showing a lens configuration of the third embodiment and FIG. 6 shows drawings illustrating aberrations thereof.

TABLE 3

| | Wide angle end | Intermediate area | Telephoto end |
|---|---|---|---|
| f | 15.97 | 22.22 | 30.92 |
| $F_{no}$ | 2.29 | 2.69 | 3.37 |
| $2\omega$ | 85.89 | 49.65 | 36.68 |

TABLE 3-continued

| | | | | | |
|---|---|---|---|---|---|
| Hereinafter, airspaces which change by variable power | | | | | |
| D7 | 2.30 | | 2.41 | | 2.38 |
| D9 | 28.25 | | 12.26 | | 1.00 |
| D20 | 34.00 | | 43.82 | | 57.62 |

| Serial numbers | Surface numbers | r | d | $n_d$ | $\nu_d$ |
|---|---|---|---|---|---|
| 1 | 111 | 42.449 | 2.00 | 1.80610 | 40.73 |
| 2 | 112 | 13.821 | 6.04 | — | — |
| 3 | 113 | −31.894 | 6.50 | 1.74100 | 52.59 |
| 4 | 114 | 23.531 | 4.45 | 1.80610 | 33.27 |
| 5 | 115 | −47.089 | 2.55 | — | — |
| 6 | 121 | −13.192 | 1.40 | 1.80420 | 46.49 |
| 7 | 122 | −22.765 | [D7] | — | — |
| 8 | 201 | 1544.698 | 5.22 | 1.51742 | 52.15 |
| 9 | 202 | −35.378 | [D9] | — | — |
| 10 | 311 | 22.982 | 6.92 | 1.49700 | 81.61 |
| 11 | 312 | −54.549 | 0.22 | — | — |
| 12 | 313 | 68.351 | 1.85 | 1.49700 | 81.61 |
| 13 | 314 | 117.898 | 4.76 | — | — |
| 14 | 321 | −29.363 | 4.00 | 1.80610 | 40.71 |
| 15 | 322 | −76.217 | 5.76 | — | — |
| 16 | 331 | −159.978 | 3.96 | 1.51742 | 52.15 |
| 17 | 332 | −23.848 | 0.20 | — | — |
| 18 | 333 | −1133.240 | 1.40 | 1.80610 | 40.73 |
| 19 | 334 | 20.009 | 6.96 | 1.49700 | 81.61 |
| 20 | 335 | −40.383 | [D20] | — | — |
| 21 | 401 | −100.000 | 3.00 | 1.77250 | 49.60 |
| 22 | 402 | −44.000 | 0.66 | — | — |
| 23 | C01 | ∞ | 3.00 | 1.48745 | 64.84 |
| 24 | C02 | ∞ | — | — | — |

Aspherical coefficient

| 111th surface | | 322nd surface | |
|---|---|---|---|
| K = | 7.47675E−01 | K = | 5.17581E+00 |
| A = | 3.60168E−05 | A = | 2.64595E−05 |
| B = | −8.54360E−08 | B = | 2.12429E−08 |
| C = | 1.58893E−09 | C = | −1.72371E−11 |
| D = | −1.03790E−11 | | |
| E = | 3.56633E−14 | | |

Embodiment 4

Figure 7:
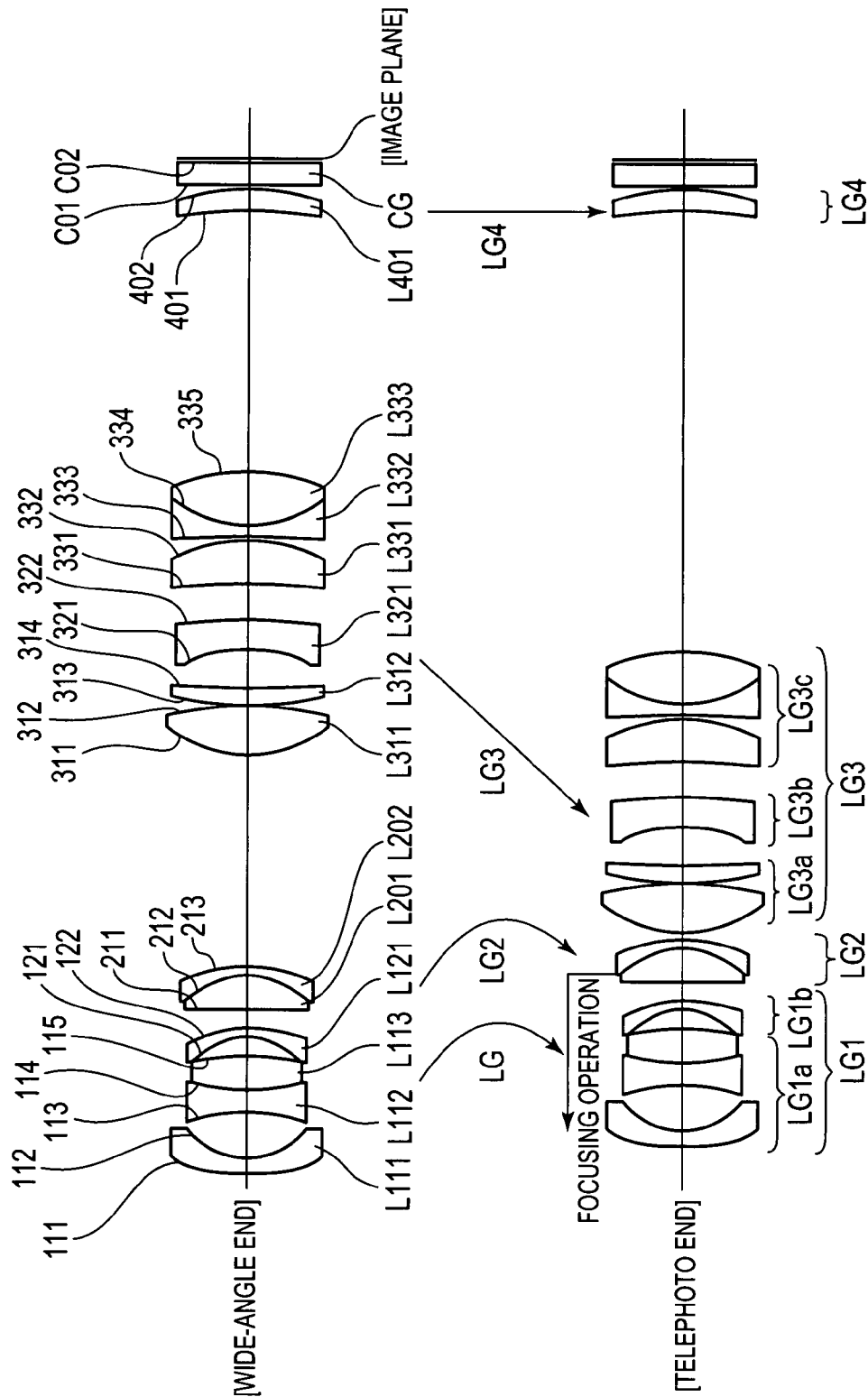
FIG. 7 is a drawing showing a lens configuration of a fourth embodiment of a zoom lens according to the invention.

A numerical example for a fourth embodiment of a zoom lens of the invention is shown in Table 4. In addition, FIG. 7 is a drawing showing a lens configuration of the fourth embodiment and FIG. 8 shows drawings illustrating aberrations thereof.

TABLE 4

| | Wide angle end | Intermediate area | Telephoto end |
|---|---|---|---|
| f | 15.98 | 22.20 | 30.93 |
| $F_{no}$ | 2.29 | 2.68 | 3.35 |
| 2ω | 65.89 | 49.76 | 36.71 |
| Hereinafter, airspaces which change by variable power | | | |
| D7 | 2.29 | 2.54 | 2.63 |
| D10 | 28.21 | 12.25 | 0.79 |
| D21 | 34.00 | 43.78 | 57.67 |

| Serial numbers | Surface numbers | r | d | $n_d$ | $\nu_d$ |
|---|---|---|---|---|---|
| 1 | 111 | 54.473 | 2.00 | 1.81474 | 37.03 |
| 2 | 112 | 14.362 | 6.30 | — | — |
| 3 | 113 | −38.457 | 3.00 | 1.80420 | 46.49 |
| 4 | 114 | 52.089 | 4.52 | 1.80518 | 25.46 |
| 5 | 115 | −39.501 | 2.42 | — | — |
| 6 | 121 | −12.744 | 1.40 | 1.80420 | 46.49 |
| 7 | 122 | −24.646 | [D7] | — | — |
| 8 | 201 | 630.073 | 4.60 | 1.61310 | 44.36 |
| 9 | 202 | −15.737 | 1.20 | 1.80610 | 40.92 |
| 10 | 203 | −27.868 | [D10] | — | — |
| 11 | 311 | 24.001 | 6.48 | 1.49700 | 81.61 |
| 12 | 312 | −59.380 | 0.20 | — | — |
| 13 | 313 | 55.599 | 2.10 | 1.48749 | 70.45 |
| 14 | 314 | 120.246 | 4.80 | — | — |
| 15 | 321 | −33.053 | 4.50 | 1.80139 | 45.45 |
| 16 | 322 | −75.538 | 4.71 | — | — |
| 17 | 331 | −79.537 | 5.91 | 1.60342 | 38.01 |
| 18 | 332 | −27.558 | 0.20 | — | — |
| 19 | 333 | −513.387 | 1.40 | 1.80100 | 34.97 |
| 20 | 334 | 19.948 | 7.24 | 1.49700 | 81.61 |
| 21 | 335 | −34.468 | [D21] | — | — |
| 22 | 401 | −100.000 | 3.00 | 1.77250 | 49.65 |
| 23 | 402 | −44.000 | 0.66 | — | — |
| 24 | C01 | ∞ | 3.00 | 1.48745 | 64.84 |
| 25 | C02 | ∞ | — | — | — |

Aspherical coefficient

| 111th surface | | 322nd surface | |
|---|---|---|---|
| K = | 1.66199E+00 | K = | 4.61791E+00 |
| A = | 4.01051E−05 | A = | 2.41819E−05 |
| B = | −9.65463E−08 | B = | 1.00152E−08 |
| C = | 1.57726E−09 | C = | −5.28970E−12 |
| D = | −1.02685E−11 | | |
| E = | 3.51916E−14 | | |

Embodiment 5

Figure 9:
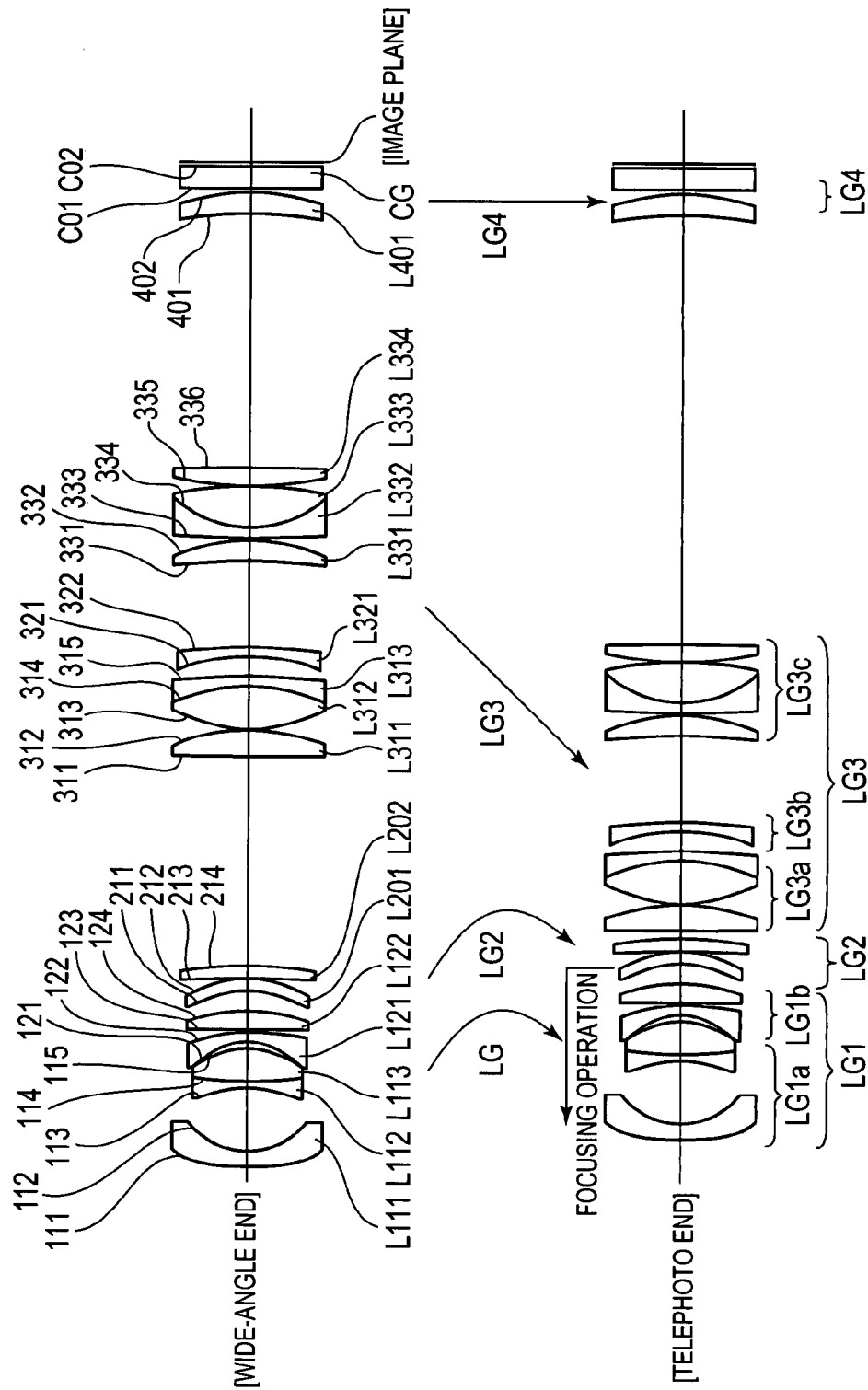
FIG. 9 is a drawing showing a lens configuration of a fifth embodiment of a zoom lens according to the invention.

A numerical example for a fifth embodiment of a zoom lens of the invention is shown in Table 5. In addition, FIG. 9 is a drawing showing a lens configuration of the fifth embodiment and FIG. 10 shows drawings illustrating aberrations thereof.

TABLE 5

| | Wide angle end | Intermediate area | Telephoto end |
|---|---|---|---|
| f | 15.94 | 22.19 | 30.85 |
| $F_{no}$ | 2.29 | 2.68 | 3.30 |
| 2ω | 66.00 | 49.73 | 36.77 |
| Hereinafter, airspaces which change by variable power | | | |
| D9 | 2.73 | 2.73 | 2.73 |
| D13 | 28.38 | 12.29 | 0.79 |
| D28 | 34.00 | 44.11 | 58.13 |

| Serial numbers | Surface numbers | r | d | $n_d$ | $\nu_d$ |
|---|---|---|---|---|---|
| 1 | 111 | 48.171 | 2.00 | 1.80139 | 45.45 |
| 2 | 112 | 13.341 | 8.42 | — | — |
| 3 | 113 | −23.394 | 1.00 | 1.83500 | 42.98 |
| 4 | 114 | 160.320 | 4.05 | 1.68893 | 31.16 |
| 5 | 115 | −17.249 | 0.99 | — | — |
| 6 | 121 | −13.375 | 1.40 | 1.83400 | 37.35 |
| 7 | 122 | −32.894 | 0.20 | — | — |
| 8 | 123 | −1418.468 | 2.58 | 1.68893 | 31.16 |
| 9 | 124 | −36.354 | [D9] | — | — |
| 10 | 201 | −20.207 | 1.40 | 1.71736 | 29.50 |
| 11 | 202 | −24.219 | 0.20 | — | — |
| 12 | 203 | −208.066 | 1.86 | 1.72342 | 37.99 |
| 13 | 204 | −62.448 | [D13] | — | — |
| 14 | 311 | 344.533 | 3.61 | 1.59240 | 68.30 |
| 15 | 312 | −41.839 | 0.20 | — | — |
| 16 | 313 | 31.495 | 5.76 | 1.49700 | 81.61 |
| 17 | 314 | −34.743 | 1.40 | 1.72000 | 50.35 |
| 18 | 315 | −120.584 | 2.53 | — | — |
| 19 | 321 | −39.047 | 1.40 | 1.69680 | 55.48 |
| 20 | 322 | −126.866 | 11.55 | — | — |
| 21 | 331 | −146.352 | 2.87 | 1.62004 | 36.30 |
| 22 | 332 | −33.336 | 0.20 | — | — |
| 23 | 333 | 121.732 | 1.40 | 2.08160 | 30.38 |
| 24 | 334 | 20.140 | 5.50 | 1.48749 | 70.45 |
| 25 | 335 | −78.168 | 0.20 | — | — |
| 26 | 336 | 67.351 | 2.26 | 1.83400 | 37.35 |

TABLE 5-continued

| | | | | | |
|---|---|---|---|---|---|
| 27 | 337 | −2544.352 | [D28] | — | — |
| 28 | 401 | −100.000 | 3.00 | 1.74330 | 49.23 |
| 29 | 402 | −44.000 | 0.66 | — | — |
| 30 | C01 | ∞ | 3.00 | 1.48745 | 64.84 |
| 31 | C02 | ∞ | — | — | — |

Aspherical coefficient
111th surface

| | |
|---|---|
| K = | −3.59128E+00 |
| A = | 4.35781E−05 |
| B = | −8.78977E−08 |
| C = | 1.32926E−09 |
| D = | −8.46794E−12 |
| E = | 2.87098E−14 |

Embodiment 6

Figure 11:
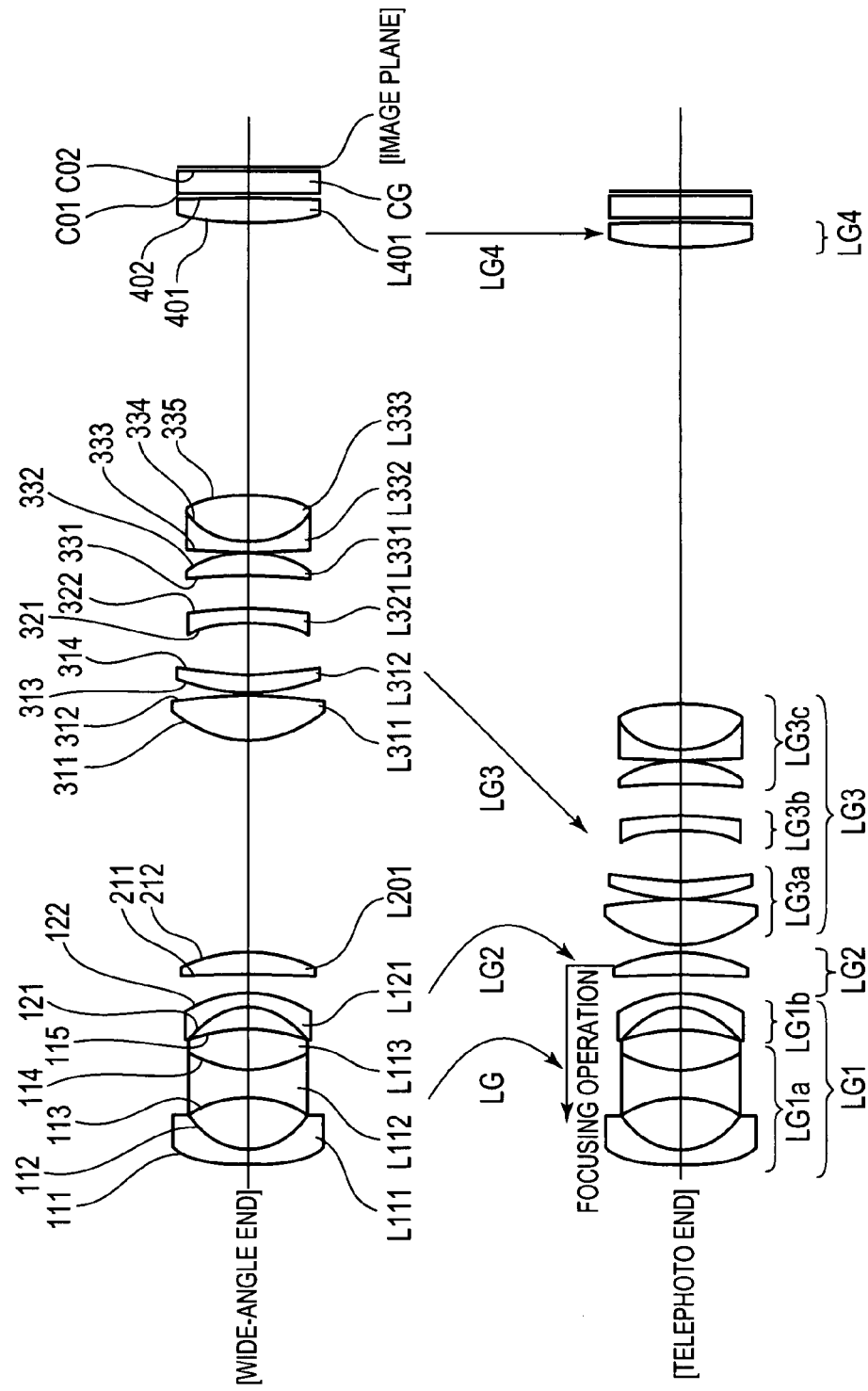
FIG. 11 is a drawing showing a lens configuration of a sixth embodiment of a zoom lens according to the invention.

A numerical example for a sixth embodiment of a zoom lens of the invention is shown in Table 6. In addition, FIG. 11 is a drawing showing a lens configuration of the sixth embodiment and FIG. 12 shows drawings illustrating aberrations thereof.

TABLE 6

| | Wide angle end | Intermediate area | Telephoto end |
|---|---|---|---|
| f | 15.98 | 22.21 | 30.98 |
| $F_{no}$ | 2.29 | 2.74 | 3.38 |
| 2ω | 65.79 | 49.11 | 36.02 |
| Hereinafter, airspaces which change by variable power | | | |
| D7 | 2.29 | 2.59 | 2.74 |
| D9 | 27.14 | 11.85 | 0.79 |
| D21 | 34.00 | 43.49 | 56.92 |

| Serial numbers | Surface numbers | r | d | $n_d$ | $v_d$ |
|---|---|---|---|---|---|
| 1 | 111 | 49.948 | 2.00 | 1.81474 | 37.03 |
| 2 | 112 | 13.594 | 6.39 | — | — |
| 3 | 113 | −25.563 | 3.42 | 1.70200 | 40.18 |
| 4 | 114 | 22.100 | 5.03 | 1.80518 | 25.46 |
| 5 | 115 | −39.176 | 2.76 | — | — |
| 6 | 121 | −13.500 | 1.80 | 1.80610 | 40.73 |
| 7 | 122 | −24.665 | [D7] | — | — |
| 8 | 201 | −140.347 | 2.73 | 1.69680 | 55.48 |
| 9 | 202 | −31.071 | [D9] | — | — |
| 10 | 311 | 24.597 | 5.58 | 1.49700 | 81.61 |
| 11 | 312 | −88.532 | 0.20 | — | — |
| 12 | 313 | 36.575 | 2.43 | 1.49700 | 81.61 |
| 13 | 314 | 78.805 | 6.33 | — | — |
| 14 | 321 | −33.901 | 2.00 | 1.80139 | 45.45 |
| 15 | 322 | −72.113 | 4.08 | — | — |
| 16 | 331 | −95.092 | 2.77 | 1.48749 | 70.45 |
| 17 | 332 | −24.400 | 0.20 | — | — |
| 18 | 333 | −211.893 | 1.40 | 1.83400 | 37.35 |
| 19 | 334 | 20.018 | 5.81 | 1.48749 | 70.45 |
| 20 | 335 | −29.068 | [D21] | — | — |
| 21 | 401 | 53.034 | 2.80 | 1.80518 | 25.46 |
| 22 | 402 | ∞ | 0.66 | — | — |
| 23 | C01 | ∞ | 3.00 | 1.48745 | 64.84 |
| 24 | C02 | ∞ | — | — | — |

Aspherical coefficient

| | 111th surface | | 322nd surface |
|---|---|---|---|
| K = | 3.29127E+00 | K = | −3.70901E+00 |
| A = | 3.23052E−05 | A = | 2.43282E−05 |
| B = | −8.50257E−08 | B = | 1.46586E−09 |
| C = | 1.33452E−09 | C = | −1.94554E−11 |
| D = | −8.49431E−12 | | |
| E = | 2.85875E−14 | | |

Embodiment 7

Figure 13:
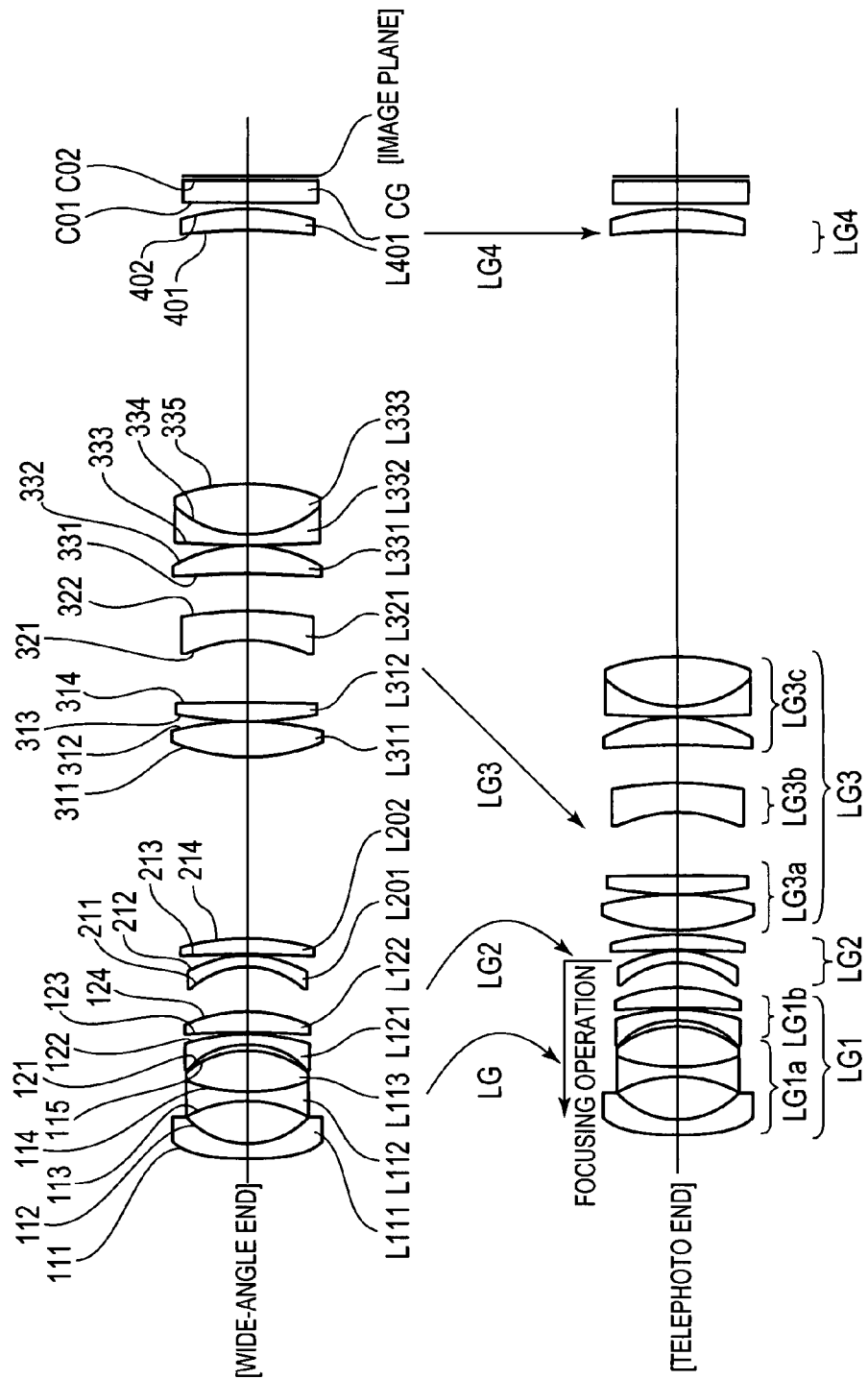
FIG. 13 is a drawing showing a lens configuration of a seventh embodiment of a zoom lens according to the invention.

A numerical example for a seventh embodiment of a zoom lens of the invention is shown in Table 7. In addition, FIG. 13 is a drawing showing a lens configuration of the seventh embodiment and FIG. 14 shows drawings illustrating aberrations thereof.

TABLE 7

| | Wide angle end | Intermediate area | Telephoto end |
|---|---|---|---|
| f | 15.91 | 22.05 | 30.78 |
| $F_{no}$ | 2.29 | 2.68 | 3.27 |
| 2ω | 66.08 | 50.15 | 36.93 |
| Hereinafter, airspaces which change by variable power | | | |
| D9 | 6.41 | 4.44 | 3.35 |
| D13 | 24.73 | 11.15 | 0.79 |
| D24 | 34.00 | 43.79 | 57.77 |

| Serial numbers | Surface numbers | r | d | $n_d$ | $v_d$ |
|---|---|---|---|---|---|
| 1 | 111 | 60.459 | 2.00 | 1.80610 | 40.88 |
| 2 | 112 | 14.751 | 5.85 | — | — |
| 3 | 113 | −23.900 | 1.40 | 1.84666 | 23.78 |
| 4 | 114 | 34.610 | 5.44 | 1.72825 | 28.32 |
| 5 | 115 | −17.855 | 0.88 | — | — |
| 6 | 121 | −15.437 | 1.46 | 1.80420 | 46.49 |
| 7 | 122 | −44.323 | 0.20 | — | — |
| 8 | 123 | ∞ | 2.60 | 1.84666 | 23.78 |
| 9 | 124 | −37.030 | [D9] | — | — |
| 10 | 201 | −15.711 | 1.40 | 1.80420 | 46.49 |
| 11 | 202 | −23.734 | 0.20 | — | — |
| 12 | 203 | ∞ | 2.03 | 1.72342 | 37.99 |
| 13 | 204 | −64.695 | [D13] | — | — |
| 14 | 311 | 32.763 | 4.95 | 1.49700 | 81.61 |
| 15 | 312 | −67.053 | 0.20 | — | — |
| 16 | 313 | 69.008 | 2.50 | 1.48749 | 70.45 |
| 17 | 314 | −563.104 | 8.51 | — | — |
| 18 | 321 | −27.396 | 4.20 | 1.80610 | 40.40 |
| 19 | 322 | −61.583 | 5.15 | — | — |
| 20 | 331 | −348.537 | 3.71 | 1.51680 | 64.20 |
| 21 | 332 | −26.991 | 0.20 | — | — |
| 22 | 333 | 123.928 | 1.40 | 1.83400 | 37.35 |
| 23 | 334 | 20.896 | 6.89 | 1.45650 | 90.22 |
| 24 | 335 | −36.431 | [D24] | — | — |
| 25 | 401 | −100.000 | 3.00 | 1.77250 | 49.60 |
| 26 | 402 | −44.000 | 0.66 | — | — |
| 27 | C01 | ∞ | 3.00 | 1.48745 | 64.84 |
| 28 | C02 | ∞ | — | — | — |

Aspherical coefficient

| | 111th surface | | 322nd surface |
|---|---|---|---|
| K = | −1.11826E+00 | K = | 1.00470E+01 |
| A = | 4.26516E−05 | A = | 2.01054E−05 |
| B = | −9.49208E−08 | B = | 3.68014E−09 |
| C = | 1.42583E−09 | C = | 2.08800E−11 |
| D = | −9.15188E−12 | | |
| E = | 3.18220E−14 | | |

Next, with respect to Embodiments 1 to 7, values corresponding to the conditional expressions (1) to (29) are shown altogether in Table 8.

TABLE 8

|  | Embodiment 1 | Embodiment 2 | Embodiment 3 | Embodiment 4 | Embodiment 5 | Embodiment 6 | Embodiment 7 |
| --- | --- | --- | --- | --- | --- | --- | --- |
| Conditional expression (1) | −0.65 | −0.64 | −0.66 | −0.67 | −0.66 | −0.65 | −0.67 |
| Conditional expression (2) | 0.41 | 0.42 | 0.43 | 0.43 | 0.42 | 0.44 | 0.42 |
| Conditional expression (3) | 2.13 | 2.13 | 2.13 | 2.13 | 2.13 | 2.13 | 2.14 |
| Conditional expression (4) | −0.41 | −0.48 | −0.55 | −0.57 | −0.43 | −0.60 | −0.39 |
| Conditional expression (5) | −0.19 | −0.36 | −0.38 | −0.46 | −0.24 | −0.40 | −0.13 |
| Conditional expression (6) | 1.95 | 1.85 | 1.91 | 1.74 | 1.68 | 1.65 | 1.87 |
| Conditional expression (7) | 1.09 | 1.17 | 1.16 | 1.11 | 1.20 | 1.18 | 1.08 |
| Conditional expression (8) | −1.13 | −1.20 | −1.21 | −1.25 | −1.19 | −1.18 | −1.03 |
| Conditional expression (9) | 1.72 | 1.74 | 1.78 | 1.81 | 1.78 | 1.77 | 1.79 |
| Conditional expression (10) | 2.22 | −18.26 | −13.39 | −16.30 | −13.06 | −13.15 | −4.01 |
| Conditional expression (11) | −0.62 | −0.71 | −0.61 | −0.66 | −0.68 | −0.68 | −0.65 |
| Conditional expression (12) | −0.48 | −0.37 | −0.50 | −0.42 | −0.68 | −0.63 | −0.67 |
| Conditional expression (13) | 1.80 | 1.76 | 1.78 | 1.81 | 1.82 | 1.77 | 1.82 |
| Conditional expression (14) | 1.04 | 1.62 | 1.81 | 1.93 | 1.22 | 1.95 | 0.85 |
| Conditional expression (15) | −0.55 | −0.41 | −0.45 | −0.57 | −0.26 | −0.51 | −0.25 |
| Conditional expression (16) | 0.01 | 0.17 | 0.24 | 0.29 | 0.05 | 0.28 | 0.07 |
| Conditional expression (17) | 0.12 | 0.05 | 0.00 | 0.02 | 0.00 | 0.03 | 0.19 |
| Conditional expression (18) | 0.45 | 0.51 | 0.52 | 0.53 | 0.49 | 0.52 | 0.47 |
| Conditional expression (19) | −0.19 | −0.22 | −0.26 | −0.21 | −0.20 | −0.20 | −0.25 |
| Conditional expression (20) | 0.24 | 0.22 | 0.23 | 0.20 | 0.21 | 0.17 | 0.30 |
| Conditional expression (21) | 1.59 | 1.53 | 1.50 | 1.52 | 1.61 | 1.49 | 1.49 |
| Conditional expression (22) | 0.56 | 0.66 | 0.69 | 0.67 | 0.05 | 0.65 | 0.49 |
| Conditional expression (23) | 71.30 | 76.03 | 81.61 | 76.03 | 74.96 | 81.61 | 76.03 |
| Conditional expression (24) | −0.50 | −0.52 | −0.54 | −0.48 | −0.41 | −0.47 | −0.58 |
| Conditional expression (25) | −0.29 | −0.44 | −0.40 | −0.46 | −0.01 | −0.55 | −0.44 |
| Conditional expression (26) | 22.56 | 23.99 | 26.15 | 24.84 | 17.65 | 33.10 | 39.86 |
| Conditional expression (27) | 0.31 | 0.30 | 0.31 | 0.30 | 0.59 | 0.35 | 0.38 |
| Conditional expression (28) | 48.34 | 46.64 | 40.88 | 46.64 | 40.07 | 33.10 | 52.87 |
| Conditional expression (29) | 0.17 | 0.16 | 0.16 | 0.16 | 0.15 | 0.24 | 0.16 |

As is obvious from Table 8, the numerical values of Embodiments 1 to 7 satisfy the conditional expressions (1) to (29), and as is obvious from the aberration drawings in each embodiment, all the aberrations are corrected properly.

What is claimed is:

1. A zoom lens comprising, in order from a magnifying side, a first lens group having a negative refractive power as a whole, a second lens group having a positive or negative refractive power as a whole, a third lens group having a positive refractive power as a whole and a fourth lens group having a positive refractive power as a whole, wherein a variable power as a whole lens system thereof is established by configuring such that the fourth lens group is left fixed while a variable power is effected, the first lens group and the second lens group are made to move on an optical axis in such a manner as to move in a direction from a magnifying side to a contracting side over a range from a wide angle end to an intermediate area and to move in a direction from the contracting side to the magnifying side over a range from the intermediate area to a telephoto end, and the third lens group is made to move on the optical axis in such a manner as to move in a direction from the contracting side to the magnifying side over a range from the wide angle end to the telephoto end, and wherein the following conditional expression (1) is satisfied with respect to a power set at the first lens group and the second lens group, the following conditional expression (2) is satisfied with respect to a power set at the third lens group, and the following conditional expression (3) is satisfied with respect to a positional relationship between the third lens group and the fourth lens group at the wide angle end:

$$-0.9 < f_w/f_{I\text{-}II} < -0.5 \quad (1)$$

$$0.3 < f_w/f_{III} < 0.55 \quad (2)$$

$$1.7 < d_{wIII}/f_w \quad (3)$$

where $f_w$: composite focal length of the whole lens system at the wide angle end (focused at a magnifying side object distance of 1700 mm from a lens surface of the first lens group which is situated closest to the magnifying side);

$f_{I\text{-}II}$: composite focal length of the first lens group and the second lens group at the wide angle end (focused at a magnifying side object distance of 1700 mm from a lens surface of the first lens group which is situated closest to the magnifying side);

$f_{III}$: composite focal length of the third lens group;

$d_{wIII}$: airspace between the third lens group and the fourth lens group at the wide angle end.

2. A zoom lens as set forth in claim 1, wherein the first lens group is made up by disposing, in order from the magnifying side, a first a lens group and a first b lens group, the first a lens group being made up by disposing, in order from the magnifying side, a meniscus negative lens element which is made convex towards the magnifying side, a negative lens element and a positive lens element, the first b lens group having a refracting surface on a side lying closest to the magnifying side which is a surface which is made heavily concave towards the contracting side and a refracting surface on a side lying closest to the contracting side which is a surface which is made convex towards the contracting side and being made up by disposing one or two lens elements, and wherein the following conditional expression (4) is satisfied with respect to a power set at the first a lens group, the following conditional expression (5) is satisfied with respect to a power set at the first b lens group, and the following conditional expression (6) is satisfied with respect to a size of the first lens group and the second lens group on the optical axis:

$$-0.85 < f_w/f_{Ia} < -0.3 \quad (4)$$

$$-0.55 < f_w/f_{Ib} < 0 \quad (5)$$

$$1.2 < T_{I\text{-}II}/f_w < 2.3 \quad (6)$$

where,
- $f_{Ia}$: composite focal length of the first a lens group which makes up the first lens group;
- $f_{Ib}$: composite focal length of the first b lens group which makes up the first lens group;
- $T_{I\text{-}II}$: a distance on the optical axis between a magnifying side surface of a lens element of the first lens group which is disposed closest to the magnifying side and a contracting side surface of a lens element of the second lens group which is disposed closest to the contracting side at the wide angle end (focused at a magnifying side object distance of 1700 mm from the lens surface of the first lens group which is situated closest to the magnifying side).

3. A zoom lens as set forth in claim 2, wherein the following conditional expression (7) is satisfied with respect to a configuration of a contracting side surface of a lens element of the first a lens group which is disposed closest to the magnifying side, the following conditional expression (8) is satisfied with respect to a configuration of a magnifying side surface of a lens element of the first b lens group which is disposed closest to the magnifying side, the following conditional expression (9) is satisfied with respect to the characteristics of the refractive index of a glass material which is used for each of the lens elements which make up the first a lens group, and the following conditional expression (10) is satisfied with respect to the dispersing characteristics of the glass material used for each of the lens elements which make up the first a lens group:

$$0.85 < f_w/r_{Ia2} < 1.45 \quad (7)$$

$$-1.5 < f_w/r_{Ib1} < -0.8 \quad (8)$$

$$1.65 < N_{Ia} \quad (9)$$

$$V_{IaP} - V_{IaN} < 5.0 \quad (10)$$

where,
- $r_{Ia2}$: radius of curvature of the contracting side surface of the lens element of the first a lens group which is disposed closest to the magnifying side;
- $r_{Ib1}$: radius of curvature of the magnifying side surface of the lens element of the first b lens group which is disposed closest to the magnifying side;
- $N_{Ia}$: mean value of the refractive indexes of the respective lens elements which make up the first a lens group relative to the d line;
- $V_{IaP}$: mean value of Abbe numbers of the respective positive lens elements which make up the first a lens group;
- $V_{IaN}$: mean value of Abbe numbers of the respective negative lens elements which make up the first a lens group.

4. A zoom lens as set forth in claim 2, wherein a focusing operation is preferably attained by moving the first lens group in the direction of optical axis, wherein at least one side of a lens element of the first a lens group making up the first lens group which is disposed closest to the magnifying side is aspheric, and wherein the following conditional expression (11) is satisfied with respect to a power to be set, the following conditional expression (12) is satisfied with respect to a configuration of a magnifying side surface of a lens element of the first a lens group which is disposed second closest to the magnifying side, and the following conditional expression (13) is satisfied with respect to the refractive index of a glass material used for the negative lens elements making up the first lens group:

$$-0.85 < f_w/f_{Ia1} < -0.5 \quad (11)$$

$$-0.8 < f_w/r_{Ia3} < -0.25 \quad (12)$$

$$1.65 < (n_{Ia1} + n_{Ia2} + n_{Ib1})/3 \quad (13)$$

where,
- $f_{Ia1}$: focal length of the lens element making up the first a lens group which is disposed closest to the magnifying side;
- $r_{Ia3}$: radius of curvature of the magnifying side surface of the lens element making up the first a lens group which is disposed second closest to the magnifying side;
- $n_{Ia1}$: refractive index of the lens element making up the first a lens group which is disposed closest to the magnifying side relative to the line d;
- $n_{Ia2}$: refractive index of the lens element making up the first a lens group which is disposed second closest to the magnifying side relative to the line d;
- $n_{Ib1}$: refractive index of the lens element making up the first b lens group which is disposed closest to the magnifying side relative to the line d.

5. A zoom lens as set forth in claim 1, wherein the second lens group is made up of a total of one or two lens elements including at least one positive lens, and wherein the following conditional expression (14) is satisfied with respect to a power condition which is set at the second lens group in relation to the first lens group and the following conditional expression (15) is satisfied with respect to the configuration of a surface of the second lens group which lies closest to the contracting side $$0.7 < f_{I\text{-}II}/f_I < 2.4 \quad (14)$$

$$-0.7 < f_w/r_{IIL} < -0.15 \quad (15)$$

where,
- $r_{IIL}$: radius of curvature of the contracting side surface of the lens element of the second lens group which is disposed closest to the contracting side.

6. A zoom lens as set forth in claim 5, wherein the following conditional expression (16) is satisfied with respect to a power set at the second lens group, and the following conditional expression (17) is satisfied with respect to variation in the airspace between the first lens group and the second lens group relative to a variable power operation from the wide angle end to the telephoto end:

$$f_W/|f_{II}| < 0.4 \quad (16)$$

$$|d_{I\text{-}II}|/f_W < 0.3 \quad (17)$$

where,
- $f_{II}$: composite focal length of the second lens group;
- $d_{I\text{-}II}$: variation in the airspace between the first lens group and the second lens group relative to a variable power operation from the wide angle end to the telephoto end (focused at a magnifying side object distance of 1700 mm from a lens surface of the first lens group which is situated closest to the magnifying side).

7. A zoom lens as set forth in claim 1, wherein the third lens group is made up by disposing, in order from the magnifying side, a third a lens group, a third b lens group and a third c lens group, the third a lens group having a positive refractive power as a whole and is made up by disposing a total of one to three lens elements including at least one positive lens element, the third b lens group being made up by disposing one lens element, the third c lens group having a positive refractive power as a whole and is made up by disposing a total of three or four lens elements including at least two positive lens and one negative lens, and wherein the following conditional expression (18), conditional expression (19) and conditional expression (20) are satisfied with respect to powers set at the third a lens group, third b lens group and third c lens group, respectively, and the following conditional expression (21) is satisfied with respect to the characteristics of the refractive index of a glass material used for each of the positive lens elements which make up the third lens group:

$$0.35 < f_w/f_{IIIa} < 0.65 \quad (18)$$

$$-0.35 < f_w/f_{IIIb} < -0.1 \quad (19)$$

$$-0.2 < f_w/f_{IIIc} < 0.35 \quad (20)$$

$$N_{IIIP} < 1.7 \quad (21)$$

where,
$f_{IIIa}$: composite focal length of the third a lens group which makes up the third lens group;
$f_{IIIb}$: composite focal length of the third b lens group which makes up the third lens group;
$f_{IIIc}$: composite focal length of the third c lens group which makes up the third lens group;
$N_{IIIP}$: mean value of refractive indexes of the respective lens elements which make up the third lens group relative to the line d.

8. A zoom lens as set forth in claim 7, wherein the following conditional expression (22) is satisfied with respect to the configuration of a magnifying side surface of a lens element of the third a lens group which is disposed closest to the magnifying side, and the following conditional expression (23) is satisfied with respect to the dispersion characteristics of a glass material which is used for each of the positive lens elements which make up the third a lens group:

$$0 < f_w/r_{IIIa1} < 0.85 \quad (22)$$

$$60 < V_{IIIaP} \quad (23)$$

where,
$r_{IIIa1}$: radius of curvature of the magnifying side surface of the lens element of the third a lens group which is disposed closest to the magnifying side;
$V_{IIIaP}$: mean value of Abbe numbers of the respective positive lens element which make up the third a lens group.

9. A zoom lens as set forth in claim 7, wherein the following conditional expression (24) is satisfied with respect to the configuration of a magnifying side surface of a lens element of the third b lens group:

$$-0.7 < f_w/r_{IIIb1} < -0.3 \quad (24)$$

where,
$r_{IIIb1}$: radius of curvature of the magnifying side surface of the lens element of the third b lens group.

10. A zoom lens as set forth in claim 7, wherein the following conditional expression (25) is satisfied with respect to the configuration of a contracting side surface of a lens element of the third c lens element which is disposed closest to the contracting side, and the following conditional expression (26) is satisfied with respect to the dispersion characteristics of a glass material which is used for each of the lens elements which make up the third c lens group:

$$-0.65 < f_w/r_{IIIcL} < 0.05 \quad (25)$$

$$15 < V_{IIIcP} - V_{IIIcN} \quad (26)$$

where,
$r_{IIIcL}$: radius of curvature of the contracting side surface of the lens element of the third c lens group which is disposed closest to the contracting side;
$V_{IIIcP}$: mean value of Abbe numbers of the respective positive lens elements which make up the third c lens group;
$V_{IIIcN}$: mean value of Abbe numbers of the respective negative lens elements which make up the third c lens group.

11. A zoom lens as set forth in claim 7, wherein the third c lens group includes a partial system constituent element which is made up of at least two lens elements, one negative lens element and one positive lens element, which are cemented together, and wherein the following conditional expression (27) is satisfied with respect to the refractive index of a glass material used for each of the lenses which are cemented together, and the following conditional expression (28) is satisfied similarly with respect to the dispersion characteristics of the glass material used for each of the lens elements which are cemented together:

$$0.25 < N_{IIIcCN} - N_{IIIcCP} \quad (27)$$

$$30 < V_{IIIcCP} - V_{IIIcCN} \quad (28)$$

where,
$N_{IIIcCP}$: mean value of the refractive indexes of the positive lens elements of the third c lens group which are disposed in the cemented partial system thereof relative to the line d;
$N_{IIIcCN}$: mean value of the refractive indexes of the negative lens elements of the third c lens group which are disposed in the cemented partial system thereof relative to the line d;
$V_{IIIcCP}$: mean value of Abbe numbers of the positive lens elements of the third c lens group which are disposed in the cemented partial system thereof;
$V_{IIIcCN}$: mean value of Abbe numbers of the negative lens elements of the third c lens group which are disposed in the cemented partial system thereof.

12. A zoom lens as set forth in claim 1, wherein the fourth lens group is made up by disposing one positive lens element, wherein the following conditional expression (29) is satisfied with respect to a power set at the fourth lens group:

$$f_w/f_{IV} < 0.3 \quad (29)$$

where,
$f_{IV}$: composite focal length of the fourth lens group.

13. A projector unit installing thereon the zoom lens of claim 1.

14. A projector unit installing thereon the zoom lens of claim 2.

15. A projector unit installing thereon the zoom lens of claim 3.

16. A projector unit installing thereon the zoom lens of claim 4.

17. A projector unit installing thereon the zoom lens of claim 5.

18. A projector unit installing thereon the zoom lens of claim 6.

19. A projector unit installing thereon the zoom lens of claim 7.

20. A projector unit installing thereon the zoom lens of claim 12.

* * * * *